(12) United States Patent
Schulter et al.

(10) Patent No.: US 11,173,017 B2
(45) Date of Patent: Nov. 16, 2021

(54) OVERDENTURE AND DENTAL IMPLANT FRAMEWORK

(71) Applicant: Cagenix, Inc, Memphis, TN (US)

(72) Inventors: Drew Schulter, Memphis, TN (US);
Carl Schulter, Germantown, TN (US);
Kyle Fraysur, Cordova, TN (US);
Daryl Newman, Williston, TN (US);
Belal Hamadeh, Memphis, TN (US)

(*) Notice: Subject to any disclaimer, the term of this patent is extended or adjusted under 35 U.S.C. 154(b) by 393 days.

(21) Appl. No.: 15/972,003

(22) Filed: May 4, 2018

(65) Prior Publication Data

US 2018/0250102 A1  Sep. 6, 2018

Related U.S. Application Data

(63) Continuation-in-part of application No. 15/068,423, filed on Mar. 11, 2016, now Pat. No. 10,123,856, which is a continuation-in-part of application No. 14/272,566, filed on May 8, 2014, now Pat. No. 10,426,711.

(51) Int. Cl.
| | | |
|---|---|---|
| *A61C 8/00* | (2006.01) | |
| *A61C 9/00* | (2006.01) | |
| *A61C 1/08* | (2006.01) | |
| *A61C 13/00* | (2006.01) | |
| *A61C 13/07* | (2006.01) | |
| *A61C 13/277* | (2006.01) | |

(52) U.S. Cl.
CPC ............ *A61C 8/0062* (2013.01); *A61C 1/084* (2013.01); *A61C 8/0027* (2013.01); *A61C 8/0048* (2013.01); *A61C 8/0095* (2013.01); *A61C 9/0006* (2013.01); *A61C 13/0004* (2013.01); *A61C 13/0025* (2013.01); *A61C 13/277* (2013.01)

(58) Field of Classification Search
CPC .............. A61C 9/0053; A61C 13/0006; A61C 13/0004; A61C 8/0054; A61C 8/0027; A61C 8/0062; A61C 1/084; A61C 8/0048; A61C 8/0095; A61C 9/0006; A61C 13/0025; A61C 13/277
See application file for complete search history.

(56) References Cited

U.S. PATENT DOCUMENTS

| | | | | |
|---|---|---|---|---|
| 5,527,182 | A * | 6/1996 | Willoughby ......... | A61C 8/0001 433/172 |
| 5,716,214 | A * | 2/1998 | Lund .................... | A61C 8/0048 433/173 |
| 5,857,853 | A * | 1/1999 | van Nifterick .... | A61C 13/0004 433/213 |
| 5,873,721 | A * | 2/1999 | Willoughby ......... | A61C 8/0001 433/173 |
| 6,142,782 | A * | 11/2000 | Lazarof ................ | A61C 8/0001 433/174 |
| 6,558,162 | B1 * | 5/2003 | Porter .................. | A61C 8/0001 433/173 |
| 7,887,327 | B2 * | 2/2011 | Marotta ................ | A61C 1/084 433/213 |
| 8,100,692 | B2 * | 1/2012 | Diangelo ............. | A61C 8/0048 433/213 |

(Continued)

*Primary Examiner* — Nicholas D Lucchesi
(74) *Attorney, Agent, or Firm* — David J. Kreher

(57) ABSTRACT

A dental prosthesis and a process for design and manufacturing, incorporating an overdenture and a dental implant framework that will be designed and manufactured simultaneously.

40 Claims, 24 Drawing Sheets

(56) References Cited

U.S. PATENT DOCUMENTS

| | | | | |
|---|---|---|---|---|
| 8,308,481 B2* | 11/2012 | DiAngelo | | A61C 8/0001 |
| | | | | 433/213 |
| 8,425,229 B2* | 4/2013 | Nilsson | | A61C 13/0004 |
| | | | | 433/172 |
| 8,992,220 B2* | 3/2015 | Berger | | A61C 8/005 |
| | | | | 433/173 |
| 2004/0166476 A1* | 8/2004 | Weissman | | A61C 8/0048 |
| | | | | 433/173 |
| 2006/0115795 A1* | 6/2006 | Marshall | | A61C 5/77 |
| | | | | 433/218 |
| 2009/0081618 A1* | 3/2009 | LaMar | | A61C 8/0069 |
| | | | | 433/218 |
| 2009/0104585 A1* | 4/2009 | Diangelo | | A61C 8/0048 |
| | | | | 433/223 |
| 2009/0325125 A1* | 12/2009 | DiAngelo | | A61C 13/0004 |
| | | | | 433/173 |
| 2011/0171604 A1* | 7/2011 | Durbin | | A61C 9/0053 |
| | | | | 433/213 |
| 2012/0088208 A1* | 4/2012 | Schulter | | A61C 8/0001 |
| | | | | 433/173 |
| 2012/0214121 A1* | 8/2012 | Greenberg | | A61B 6/5247 |
| | | | | 433/24 |
| 2014/0051037 A1* | 2/2014 | Fisker | | A61C 13/225 |
| | | | | 433/213 |
| 2014/0205969 A1* | 7/2014 | Marlin | | A61B 6/4085 |
| | | | | 433/173 |
| 2015/0164620 A1* | 6/2015 | Berger | | A61C 8/0068 |
| | | | | 433/173 |
| 2015/0250569 A1* | 9/2015 | Frick | | A61C 13/0006 |
| | | | | 433/202.1 |
| 2015/0320520 A1* | 11/2015 | Schulter | | A61C 5/77 |
| | | | | 433/29 |
| 2016/0270886 A1* | 9/2016 | Schulter | | A61K 6/84 |
| 2018/0008383 A1* | 1/2018 | Schulter | | A61C 8/0048 |
| 2018/0008384 A1* | 1/2018 | Schulter | | C08L 33/08 |
| 2019/0046307 A1* | 2/2019 | Schulter | | A61C 13/0004 |
| 2020/0078143 A1* | 3/2020 | Schulter | | A61K 6/84 |
| 2020/0170764 A1* | 6/2020 | Schulter | | A61C 13/0004 |

* cited by examiner

OVERDENTURE AND DENTAL IMPLANT FRAMEWORK

CROSS-REFERENCE TO RELATED APPLICATIONS

Ser. No. 15/068,423 March, 2016 Schuler, et al.
Ser. No. 14/272,566 May, 2014 Schulter, et al.
66/821,1238 May, 2013 Schulter, et al.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

Dentists are continuously searching for methods in which they can provide aesthetic and durable prostheses for their patients. One of the greatest challenges they face with current implant framework overdentures is providing a restoration that will resist the occlusal forces in a reduced vertical restorative dimension while obtaining a high level of aesthetics. Dentists are also looking for a cost effective and time efficient manner in which to obtain this result. In application Ser. No. 15/068,423, the Inventor demonstrated a novel dental prosthesis with an implant framework supporting a veneering overlay to provide improved aesthetics and functionality. In one of the embodiments of the invention, the veneering overlay and dental implant framework are designed on the basis of digital data defining the appropriate tooth contours, gingiva contours, and implant locations. The veneering overlay duplicates the anatomy provided in the digital data defining the appropriate tooth position and gingiva contours of the final prosthesis. The veneering overlay and dental implant framework are designed simultaneously and with a predefined mating surface and clearance gaps to ensure the appropriate mating of the veneering overlay to the dental implant framework. The unique mating surface is created through the use of a CAD subtract body that is dependent upon the design features of the dental implant framework. The veneering overlay and dental implant framework are permanently affixed to one another in providing the completed dental prosthesis. This veneering overlay and dental implant framework design provides significant advantages for cases where there is limited restorative space in creating a fixed restorative solution for the patient. This application will disclose a new removable dental prosthesis consisting of an overdenture and dental implant framework. This application will also disclose a design method that provides advantages over current systems and products in the marketplace and address the challenges of limited restorative space. Finally, this application will disclose a CAD subtract body that will be unique in the creation of the removable dental prosthesis.

Background of the Invention

This application is a continuation in part of U.S. patent application Ser. No. 15/068,423 filed Mar. 11, 2016, which is a continuation in part of U.S. patent application Ser. No. 14/272,566 filed May 8, 2014, which claims the benefit of U.S. Provisional Patent Application No. 66/821,1238 filed May 9, 2013. The benefit of the earlier filing date of the aforementioned U.S. patent application Ser. Nos. 15/068,423 and 14/272,566 and Provisional Patent Application No. 66/821,1238 is hereby claimed.

Traditional overdenture prostheses consist of an acrylic processed dental overdenture supported and retained by a milled or cast framework or bar where the processed acrylic overdenture has been fabricated to fit "over" the framework or bar and be removable by the patient. This process requires a high level of skill and significant time in the laboratory. Many times, due to the limited restorative space, these traditional removable prostheses break and fracture due to the occlusal forces of the patient exceeding the strength of the acrylic. In attempts to improve the fit and strength of the overdenture, doctors and laboratory technicians place a metal structure commonly referred to as an overcasting to seat onto the framework and be embedded into the processed overdenture. Typically, the denture teeth are bonded or fixated to the overcasting by means of a processed acrylic. The overcasting improves the quality of fit for the overdenture onto the framework and provides an accurate path of insertion for the patient. However, there are instances, especially in cases with limited restorative space, where the overcasting further reduces the volume of acrylic and therefore reduce the amount of occlusal forces the overdenture can resist before the denture teeth break away from the overcasting. This application will disclose an improved removable dental prosthesis consisting of an overdenture and dental implant framework and a design process that will provide improved performance in these spatially limited cases while still achieving the necessary aesthetics for the dentist and their patients. This application will also disclose a CAD subtract body that will be unique in the creation of the removable dental prosthesis.

In U.S. patent application Ser. No. 15/068,423 Schulter et al. teaches a dental prosthesis consisting of a veneering overlay and a dental implant framework intended to mate to a series of implants and abutments.

In U.S. Pat. No. 8,100,692 Diagenlo, et al., teaches a dental framework that is attached to dental anchors, such as dental implants which are secured to the patient's mandible or maxilla, where the framework may be fabricated based on the dimensions and surface contours of a stone cast and diagnostic wax-up created from an impression of the patient's mouth.

In U.S. patent application Ser. No. 11/876,450 Karlsson and U.S. Pat. No. 6,261,098 teaches of the utilization of a dental scanning unit commonly found in the market place.

SUMMARY OF THE INVENTION

In accordance with the first embodiment of the invention, a dental prosthesis is disclosed for restoring the appearance and function of a patient's missing teeth comprising an overdenture, a dental implant framework and a series of implants and abutments adapted to be placed within a patient's mouth. The design of the overdenture and dental implant framework are based upon digital data obtained from the patient. The dental implant framework comprising a plurality of fittings to mate with the corresponding implants and abutments in the patient's mouth, wherein the plurality of fittings is defined one or more fittings, where the position of the fittings has been determined through the use of digital data identifying the location of the implants and abutments in the patient's mouth. The dental implant framework further comprising of a plurality of bridging structures, wherein the plurality of bridging structures features is defined as at least one bridging structure, and a plurality of retention features, wherein the retention features is defined as at least one retention feature. The overdenture comprising a plurality of tooth and gingiva contours, wherein the plurality of tooth and gingiva contours is defined as at least one tooth contour and/or at least one gingiva contour, as defined by the digital data. The overdenture also consisting of a monolithic design where the tooth contours and gingiva contours are included in the same body. The overdenture being able to be removed from the dental framework and retention features by the patient or doctor. The overdenture comprising an overdenture mating surface created by a plurality of unique subtract bodies, wherein the plurality of unique subtract bodies is defined as at least one subtract body, for mating with the dental implant framework.

In accordance with the second embodiment of the invention, a unique CAD subtract body is disclosed to create the mating surface for an overdenture to a dental implant framework. The overdenture and dental implant framework are designed on the basis of digital data defining the appropriate tooth contours, gingiva contours, and implant locations. The dimensions of the unique CAD subtract body are dependent upon the dimension of the dental implant framework including the design of the retention features and attachments. Some of the dimensions of the unique CAD subtract body are used in creating the mating surface for the overdenture to mate with the dental implant framework, where other dimensions are used in creating clearance gaps between the overdenture and dental implant framework. Portions of the clearance gaps are intended to allow for attachments to be affixed to the overdenture and enable the overdenture to be retained to the dental implant framework by means of the retention features. The unique CAD subtract body is fully parametric and can be updated per the unique requirements of the patient, dentist, or technician.

In accordance with the third embodiment of the invention, a dental prosthesis is disclosed for restoring the appearance and function of a patient's missing teeth comprising an overdenture, a series of implants and overdenture abutments adapted to be placed within a patient's mouth. The design of the overdenture is based upon digital data obtained from the patient. The position of the plurality of implants and overdenture abutments, wherein the plurality of implants and overdenture abutments is defined as at least one implant and/or at least one overdenture abutment, has been determined through the use of digital data identifying the locations in the patient's mouth. The overdenture comprises of a plurality of tooth and gingiva contours as defined by the digital data. The overdenture consists of a monolithic design where the tooth and gingiva contours are included in the same body. The overdenture abutments each consisting of a plurality of retention features, wherein the plurality of retention features is defined as at least one retention feature, for retaining the overdenture. The overdenture being able to be removed from the overdenture abutments and retention features by the patient or doctor. The overdenture further comprises an overdenture mating surface providing an appropriate recess to mate or provide clearance areas for the fixation of the overdenture abutments, retention features or attachments and created on the basis of a plurality of unique subtract bodies.

In accordance with the fourth embodiment of the invention, a plurality of unique CAD subtract bodies is disclosed to create the mating surface for an overdenture to a plurality of overdenture abutments, wherein the plurality of overdenture abutments is defined as at least one overdenture abutment. The dimension of the unique CAD subtract body are dependent upon the design features of the overdenture abutments, retention features or attachments. Some of the dimensions of the unique CAD subtract body are used in creating the mating surface for the overdenture to mate with the plurality of overdenture abutments, retention features or attachments and where other dimensions are used in creating clearance gaps between the overdenture and plurality of overdenture abutments, the plurality of retention features or plurality of attachments, wherein the plurality of attachments is defined as at least one attachment. The unique CAD subtract body is fully parametric and easily edited. The design of the overdenture and plurality of overdenture abutments is determined from digital data defining the appropriate tooth contours, gingiva contours and implant locations for the dental prosthesis.

DETAILED DESCRIPTION OF THE INVENTION

The overdenture is supported by a dental framework (also referred to as a bar or overdenture bar) which functions as a structural support and point of attachment. The dental framework is attached to dental anchors, such as dental implants which are secured to the patient's mandible or maxilla. The framework may be fabricated based on the dimensions and surface contours of a stone cast and diagnostic wax-up created from an impression of the patient's mouth such as described in U.S. Pat. No. 8,100,692. The stone cast replicates the soft tissue contours and implant positions in the patient's mouth. The diagnostic wax-up represents the final prosthesis and ultimately the position of the denture teeth to be restored for the patient. In order to create the diagnostic wax-up, the dentist or technician will position upon the stone cast the stock denture teeth and wax as required for proper prosthetic function and aesthetics. The commercially available stock teeth are generally manufactured with predetermined geometries of a typical given tooth in various sizes by a third-party manufacturer.

Figure 1:
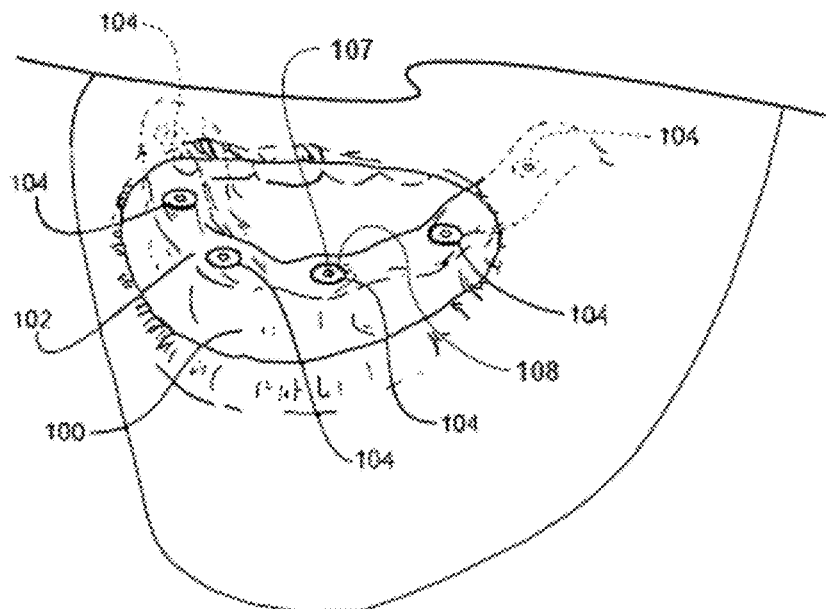
FIG. 1 is a fragmentary perspective view of a patient's open mouth with the anchors embedded in the patient's mandible.

Retention of the dental implant framework and ultimately the removable dental prosthetic requires anchors secured in the patient's mouth. In FIG. 1, the patient's jaw or mandible 100 can be seen overlaid with soft mucosal tissue 102 (For the purposes of this description, the inventor will be utilizing the term mucosal tissue or soft tissue to describe any of the soft tissue found in the oral cavity, which may include but not limited to mucosal, gingiva, or alveolar tissue). An anchor 104, also known as an "implant" or "fixture" is shown embedded into the patient's mandible 100. This anchor is retained within the bone of the mandible by a screw thread. It is driven into the mandible 100 by coupling a wrench or similar device to the top of the anchor 104 and rotating the wrench to drive the anchor into the jaw bone just as one would drive a screw into a piece of wood. In an alternative embodiment, the anchor 104 is press fitted into a hole formed with a drill, reamer, broach, osteotome, or similar device.

FIG. 1 illustrates the first step in the process, that of forming an opening in the mandible of the patient and fixing an anchor therein, while leaving a top surface of the anchor exposed above mucosal tissue 102 for mating (coupling) to and supporting a dental prosthesis or restorative component such as a denture, overdenture, bridge, crown, framework, abutment, healing cap, or coping. Note that while the process illustrated herein describes and illustrates a mandible for illustration purposes, the same process is performed to embed anchors 104 into the patient's maxilla and create dental prostheses for the maxilla.

To attach anchors 104, the dentist first makes an incision in the mucosal tissue 102 where a missing tooth or teeth would normally extend from the mandible where it is embedded, through the gum, and into the oral cavity. Once the incision is made, the dentist makes a hole (which may include such processes as drilling, broaching or reaming) in the mandible 100 in the same general direction and location as the missing tooth. The dentist then fixes an anchor 104 into the hole thus created and sutures the incision, typically leaving mating surface 108 of anchor 104 exposed while the bone osseointegrates to the outer surface of anchor 104. Alternatively, the dentist may attach a healing cap to the anchor 104 and suture the gum around or over the top of the anchor 104 and the healing cap, permitting the gum to heal around or over the top of the anchor 104 as it osseointegrates. In this alternative process, once the anchor has osseointegrated, the dentist incises the mucosal tissue 102 extending over the top of the now-integrated anchor 104 and retracts the mucosal tissue to each side, exposing the mating surface 108 of anchor 104 and permitting the mucosal tissue to heal.

Figure 2:
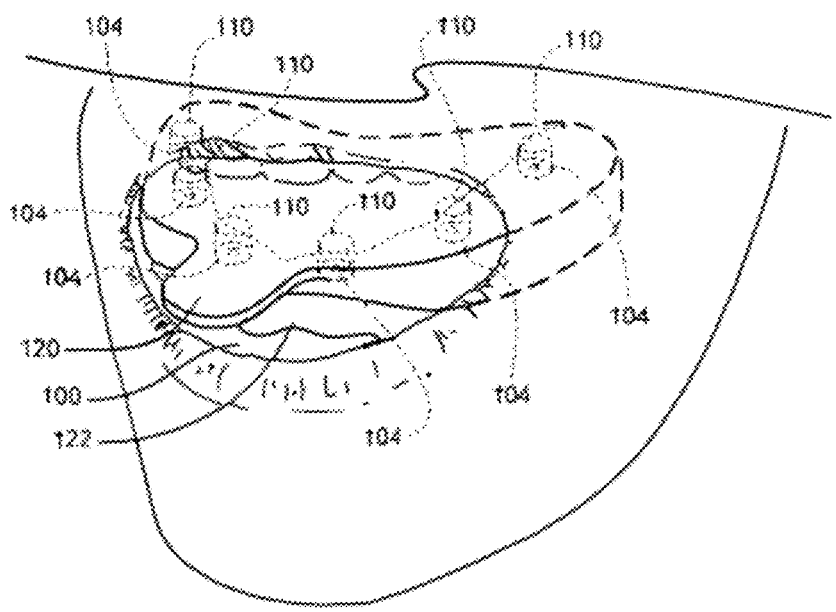
FIG. 2 is a fragmentary perspective view of the patient's open mouth with several copings attached to the anchors and an impression tray with impression material surrounding the patient's mucosal tissue and submerging the copings.

The anchor 104 has a central longitudinal aperture 107 in the top which is configured to receive an impression coping 110, as shown in FIG. 2, (or a fastener configured to mount the impression coping 110) that is affixed to the anchor 104. This coping transfers the size, shape, location or orientation of the mating surface 108 of the anchor (and preferably all four) to the stone cast (see below). It is the mating surface 108 that is oriented to the finished dental prosthesis, and hence the mating surface 108 from which the structures of the dental prosthesis that mount to the anchors are derived. In general, anywhere from one to twelve of these anchors are embedded in the jaw and are provided as mounting points for the dental prosthesis. In an alternative configuration, anchor 104 may have a variety of configurations on its mating surface 108 including threaded or unthreaded protrusions or recesses that are configured to engage a denture. The use of an anchor 104 having a central aperture and internal threads for engaging a coping is a matter of convenience herein and should not suggest that the process is limited to an anchor having this configuration.

Mating surface 108 is typically the surface on which the dental prosthesis will be mounted or a surface having a predetermined position with respect to that surface on which the denture will ultimately be mounted. The coping 110 is configured to engage surface 108 and surrounding structures of anchor 104 (if any) such as holes that extend into (or protrusions that extend above) the surface 108.

These inter engaging surfaces of coping 110 and anchor 104 serve to align the coping and the anchor in predetermined positions with respect to each other when fixed together, such that if one knows the position and orientation of surfaces on the coping one can know the position and orientation of corresponding structures on the anchor 104 and more preferably when a scanner (see below) determines the position and orientation of structures on copings 110 it can mathematically determine the position and orientation of corresponding structures on anchors 104. Anchor 104 is preferably cylindrical and has a longitudinal axis 111, as does coping 110. In a typical arrangement, when the coping 110 is fixed in its predetermined position with respect to anchor 104, a longitudinal axis 111 of the coping is coaxial with the longitudinal axis of the anchor 104. The coping 110 and the anchor 104 are preferably threadedly engaged to permit surfaces on the coping to be drawn down tightly against mating surface 108 for precise alignment of their inter engaging surfaces. Alternatively, the coping 110 and anchor 104 to which it is coupled may be equipped with inter engaging snap fastening connecting surfaces that hold the coping in the proper orientation with respect to anchor 104.

In FIG. 1, the edentulous mandible 100 has six anchors 104 affixed therein in a spaced-apart relation extending from the front of mandible 100 around each side. The anchors 104 are disposed in a generally upright and parallel relation extending into the top surface of mandible 100. The dentist attaches corresponding copings 110 to the top of each anchor 104 and extends upward in a generally upright and parallel relation to the other copings 110. The application illustrated herein shows the use of six anchors configured to support the removable prosthesis. Other applications with more or fewer anchors 104 are possible. Furthermore, the mandible need not be edentulous (shown here), but may have, and often does have, one or more natural teeth remaining in the maxilla or mandible between which the anchors 104 are embedded to support one or more dentures (such as fixed or removable partial dentures) to fill the gap or gaps between the existing natural teeth. In this case, the anchors would not be spaced evenly about the mandible, as shown here, but would be spaced irregularly in the gaps created by the absence of natural teeth.

FIG. 2 illustrates the next step in the process of creating a removable prosthesis, the step of creating an impression of the patient's mandible. This figure shows an impression tray 120 filled with flexible impression material 122. The tray is a semi-flexible plastic structure that holds the impression material 122 in position around the patient's teeth (if any) and mucosal tissue. FIG. 2 shows a tray 120 for the mucosal tissue and mandible of the patient.

The copings 110 previously attached by the dentist to the anchors 104 are completely submerged by the dentist in impression material 122 such that the entire outer surfaces of the copings 110 extending above the surface of the mucosal tissue on the patient's mandible 100 are completely covered. The impression material is left in this position to set. Once set, the individual copings 110 are fixed with respect to each other in the same position and orientation that the anchors 104 are fixed with respect to each other. The curing process fixes the copings in this position and thereby permits the copings to be collectively removed together with the impression material while preserving their orientation.

In the next step of the process, the dentist flexes the tray 120 and the now cured impression material 122 and removes them from the patient's mouth. Enough impression material 122 is placed in the tray and disposed around the patient's mandible 100 to cover of the mucosal tissue 102 of the mandible as well as the copings 110.

When the tray 120 and impression material 122 are removed, the copings are removed with them, embedded in the now-cured impression material 122. The process of removal disconnects the copings 110 from the anchors 104, permitting the copings to be removed while still embedded in the impression material 122. If the copings include a threaded portion that holds them to the anchors, this threaded portion is unthreaded from the anchors. If the copings are fastened to the anchors with a snap fastening portion, the snap fastening portions are unsnapped from each other. The now-cured impression material 122 that couples the copings 110 to each other preserves the relative positions and orientations of the mating surfaces of all the copings 110 and hence relative positions and orientations of the mating surfaces 108 of all the anchors 104 with respect to each other. This relationship is preserved in the relative positions and orientations of the surfaces of copings 110 that were connected to the mating surfaces 108 of anchors 104.

To even further ensure the preservation of this relationship, some dentists will attach the copings 110 to one another by applying a light-cured or cold-cured acrylic material prior to submerging them in the impression material 122. The impression material 122 in which copings 110 are embedded also preserves the surface contours of the mucosal tissue of the mandible and their relative positions with respect to the mating surfaces of copings 110 and anchors 104. The surface of the impression material 122, once removed from the patient's mouth, is a negative replica of the soft tissue. The surfaces of copings 110, now separated from anchors 104 and exposed on the inside surface of the impression material 122, are a negative replica of surfaces 108 of anchors 104 to which they were coupled. The now-cured impression material 122 is therefore a negative replica of all the free surfaces, mucosal tissue, and the surfaces of the copings embedded in the impression material are a negative replica of the mating surfaces 108 of anchors 104. The cured impression material with embedded copings is commonly called an "impression" and identified in the figures herein as item 123.

Figure 3:
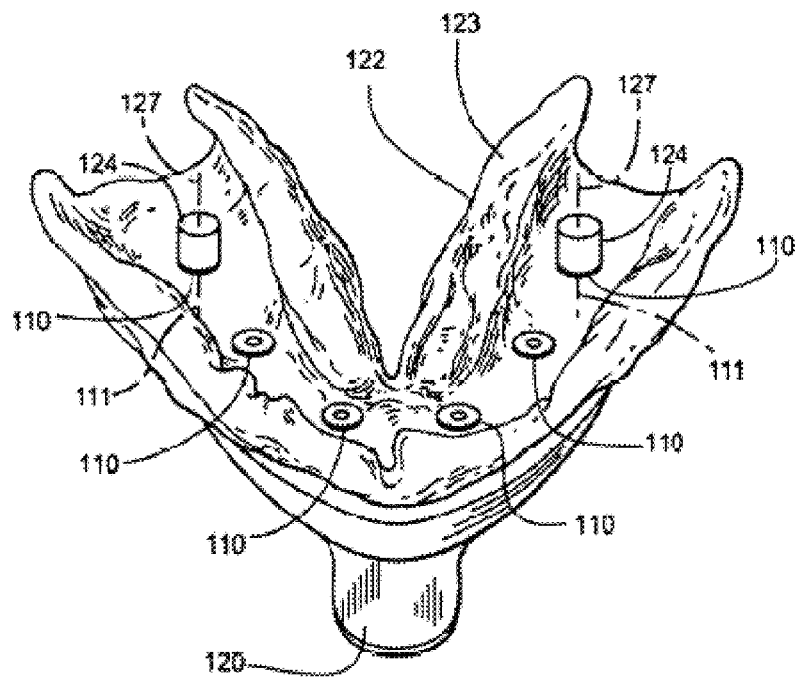
FIG. 3 is a perspective view of the impression of FIG. 2 inverted and removed from the patient's mouth with two analogs attached to two of the copings.

FIG. 3 shows the impression 123 inverted and removed from the patient's mouth. In this embodiment, there are six copings 110 embedded in the impression 123. The bulk of the copings 110 are embedded in the impression 123. Only the very ends of the copings 110 extend upward and out of the impression 123 (in this inverted orientation).

In FIG. 3 the dentist has begun the next step of the process, that of attaching analogs 124 to the exposed surfaces of all of the copings 110. Analogs 124 are structures that replicate the anchors 104. As in the case of the copings themselves, each analog 124 preferably comprises a generally cylindrical body with a longitudinal axis 127 that is coaxial with the longitudinal axis 111 when attached to coping 110.

The end surfaces of analogs 124 are configured to abut and mate with the free surfaces of the copings 110 that were previously coupled to anchors 104 and normally attach in the same manner as copings 110 to anchors 104. The surfaces of analogs 124 replicate the position and orientation of mating surfaces 108 of anchors 104. In effect, the spacing and orientation of anchors 104 was transferred to the copings 110, and transferred back again to analogs 124, which have the same spacing and orientation as the anchors 104. Thus, each analog 124 is coaxial with and is disposed in the same position as anchor 104.

Figure 4:
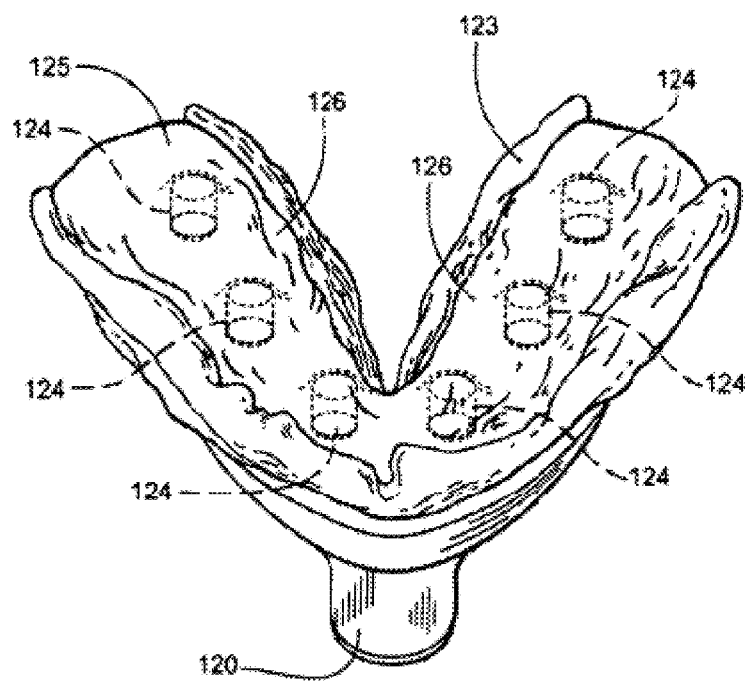
FIG. 4 is the same perspective view of FIG. 3, but with analogs attached to all the copings, and the impression filled with dental stone material and the analogs submerged in the dental stone material.

In the next step of the process, illustrated in FIG. 4, the dentist pours a mixed dental stone material 126 into the cavity in impression 123 that was formed by the patient's mandible, submerging all of the analogs 124. Stone material 126 covers the exposed portion of the analogs 124 as well as the surfaces of impression 123 formed by the patient's mucosal tissues and mandible. Once filled into impression 123, the stone material 126 is then permitted to harden to a rock-like consistency, creating a structure that is called a "stone cast" 125.

Figure 5:
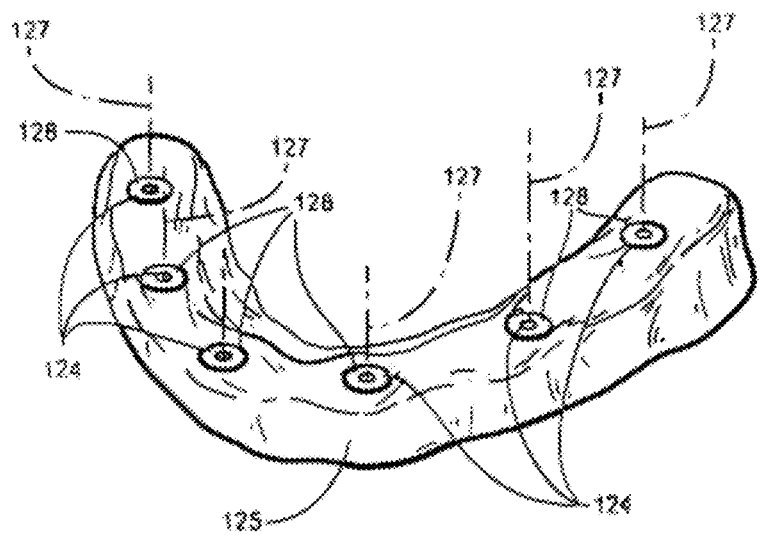
FIG. 5 is a perspective view of the stone cast formed by the dental stone material poured in the impression of FIG. 4 in its hardened state, inverted, and with the impression removed showing the analogs with the analog surfaces that mated with the copings (in FIG. 4) now exposed.

FIG. 5 represents the next step of the process which the dentist performs once the stone material 126 has hardened. The dentist removes impression 123 from the stone cast 125, leaving the stone cast 125 with the analogs embedded therein. The stone cast 125 positively replicates the position and orientation of mating surfaces 108 of anchors 104, which are represented in the stone cast 125 by the mating surfaces 128 of the analogs 124 that were fixed to the free ends of copings 110 (FIG. 3). The portions of the stone cast 125 surrounding analogs 124 positively replicates the surface of the mucosal tissues of the mouth, which were transferred from the mucosal tissues of the mouth to the impression as a negative replica and then back to the stone cast as a positive replica of those tissues. The stone cast 125 also replicates the surface of the patient's existing teeth (not shown). When the patient has existing teeth, the position and orientation of the surfaces of the teeth are transferred first to the impression as a negative replica and then to the stone cast as a positive replica. In the present embodiment, the mandible 100 is edentulous and therefore there are no existing teeth.

In the preferred embodiment, the mating surfaces 108 of anchors 104 are exactly duplicated by the mating surfaces 128 of the analogs 124: they are in exactly the same position and at exactly the same orientation. In an alternative embodiment, the mating surfaces 128 on the analogs may be offset slightly or configured slightly differently than the mating surfaces 108 of anchors 104. In some cases, manufacturers choose to make analogs or other connecting components that have mating surfaces slightly different from the mating surfaces 108 of the anchors 104 for example to permit the copings 110 to be more easily attached to anchors 104 or to permit analogs 124 to be more easily attached to copings 110. Any slight difference in position such as this is intentional, however, and is eliminated later in the process when the denture is created so that the mating surfaces of the denture are precisely oriented to mate properly with surfaces 108 of anchors 104 in the patient's mouth.

Further, the anchors 104 in the patient's mouth may not be connected directly to the dental framework. Abutments may be mounted on the anchors 104 (i.e. the anchors have surmounted abutments). The dental framework may be mounted to these abutments, and thus indirectly mounted to anchors 104. When the dental framework being designed is intended to be mounted on abutments mounted on anchors 104, the analogs 124 may be provided with surmounted abutments, i.e. the analogs may include the abutment design incorporated into it, to replicate the mating structure of the abutment to the framework.

While the mating surfaces 128 of the analogs 124 and the mating surfaces 108 of anchors 104 may be slightly differently configured, the longitudinal axes of each of the anchors 104 and the analogs 124 are preferably identically oriented and spaced apart, each pair of corresponding analog and anchor sharing a common longitudinal axis (i.e. they are coaxial). Considered differently, if the surface of the stone cast representing the soft tissues of the patient's mouth could be superimposed on top of the patient's mucosal tissues 108 that formed the stone cast 125, all the longitudinal axes defined by the analogs would be superimposed on (i.e. simultaneously coaxial with) all the corresponding axes defined by the anchors. The longitudinal axes 127 of the analogs 124 and the surfaces of the stone cast 125 defined by the mucosal tissues 108 the patient are positive replicas of the longitudinal axes 111 of anchors 104 and the surfaces of mucosal tissues 108.

Once the dentist has created the stone cast 125, which is a positive replica of the patient's jaw, including replication of mucosal tissue and anchors (or any existing teeth if present), the dentist then proceeds to the next step in the process: designing and creating the dental prosthesis that will be fitted to the patient's mouth (in this case, the patient's jaw).

The dentist or technician manually creates a diagnostic wax-up 130 of the desired denture teeth position and occlusal orientation, using flexible molding materials such as wax, acrylic, or other polymers and stock denture teeth commonly found in the market. These stock denture teeth are of a known dimension and have contours specific to the mold or catalog number of the denture teeth. These denture teeth are also made from a combination of materials such as acrylic and composite. The composite portion is typically used for the aesthetic upper portion of the denture tooth as the composite can provide the appearance of translucency. The lower portion of the denture tooth typically consists of acrylic which is ideal in bonding to the processed acrylic for the denture base or acrylic used in adhering the denture teeth to a milled or cast framework for a traditional hybrid dental restoration. The dentist or technician may also modify these denture teeth slightly in order to provide the appropriate occlusal scheme to best fit any existing teeth or dental prosthesis on the opposing arch. These modifications may include but are not limited to the addition of occlusal contours by adding wax or the removal of occlusal contours by modifying the surface with a bur and hand piece.

The diagnostic wax-up 130 is created to verify the proper location of the denture gingiva and mucosal tissue contours and denture teeth with respect to the patient's actual mouth to ensure proper tooth orientation, and to ensure that the location and placement of the denture within the patient's mouth restores form, fit and function. In short, the diagnostic wax-up 130 is a model of and looks like the removable dental prosthesis that is ultimately produced, but is made of softer materials to permit it to be adjusted and adapted until the patient and dentist are pleased with its form, fit, function and aesthetics. Recreating the appropriate gingiva, soft tissue and mucosal tissue contours for the removable dental prosthesis is a critical aspect of the diagnostic wax-up. For the purposes of this description, the inventor will be utilizing the term gingiva contours to describe the gingiva, soft tissue or mucosal tissue contours recreated in the diagnostic wax-up or final prosthesis for the patient.

The dentist creates the wax-up 130 on the stone cast 125, building it up on the patient's replica mucosal tissue. When the dentist is finished making the wax-up 130, he removes the wax-up 130 from the stone cast 125, and places it into the patient's mouth so the patient can see, firsthand, what the denture or prosthesis will look like when it is finished. If the wax-up 130 fits, the patient can bite properly, and the patient is pleased with the appearance of the wax-up 130, the dentist then proceeds to manufacture the framework and resulting prosthesis.

Figure 6:
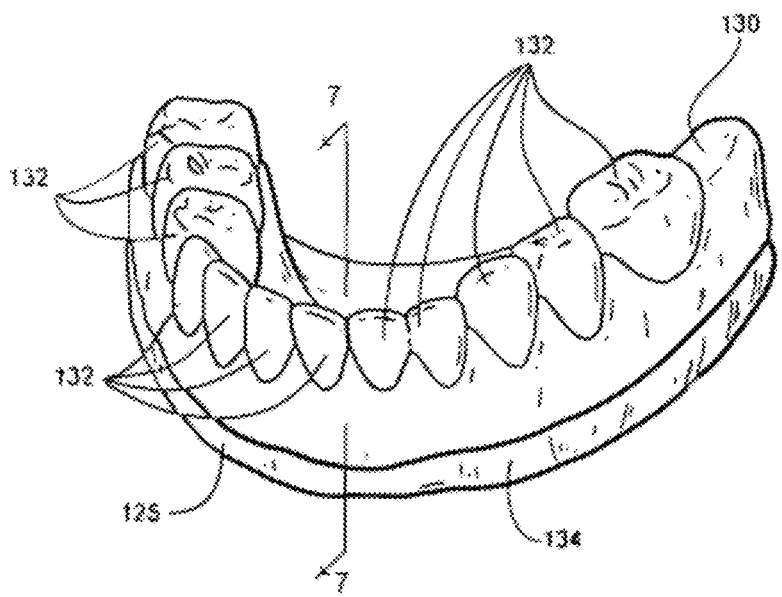
FIG. 6 is a perspective view of the stone cast of FIG. 5 with the dentist's fabricated diagnostic wax-up built up on the stone cast and abutting the analogs.
Figure 7:
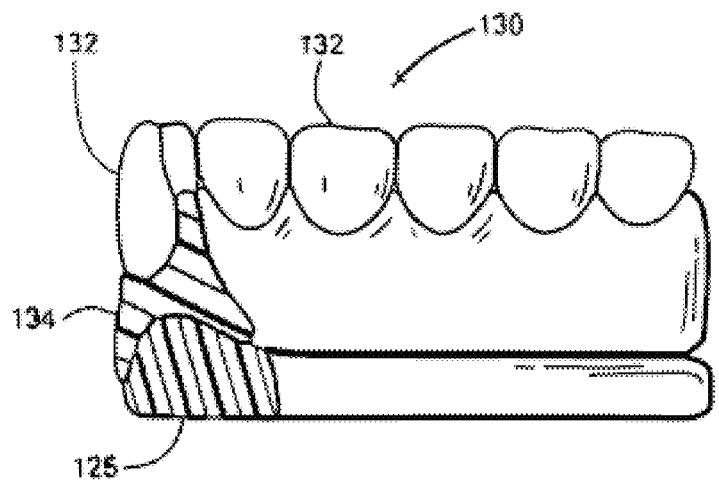
FIG. 7 is a cross-sectional view of the stone cast of FIG. 6 taken at section line 7-7 in FIG. 6.

FIGS. 6-7 illustrate the process of creating a wax-up, showing the stone cast 125 as it would appear with a wax-up 130 modeled on its outer surface. In FIG. 6, the stone cast 125 is shown covered with the wax-up 130 which comprises the denture teeth 132 embedded in wax 134 which the dentist has molded directly to the surface of the stone cast 125. FIG. 7 is a cross-sectional view through the stone cast 125 plus wax-up 130 shown in FIG. 6. This cross-section is taken at section line 7-7 in FIG. 6. Once the dentist has created the wax-up 130 and has verified the fitting of the wax-up 130 in the patient's mouth, he can then begin the process of having the framework fabricated for the patient. Traditionally these frameworks have been cast, but more recently it has become common for these frameworks to be scanned and duplicated in an appropriate dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ) by a common manufacturing method (milling, 3D printing, laser sintering, EDM, etc. . . . ). Also the term framework can also be referred to as bar, implant bar or overdenture bar as common in the art.

Figure 8:
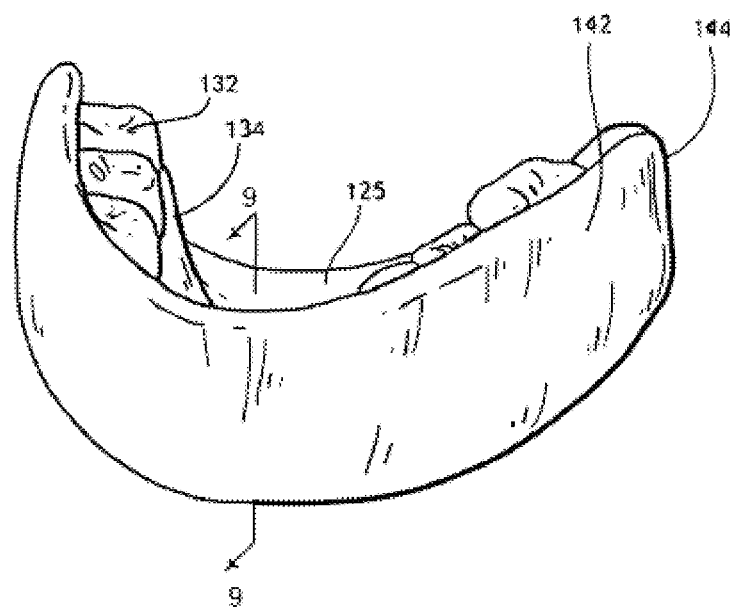
FIG. 8 is a perspective view of the stone cast of FIGS. 5-7, with a putty index molded to the facial aspect of the diagnostic wax-up.
Figure 9A:
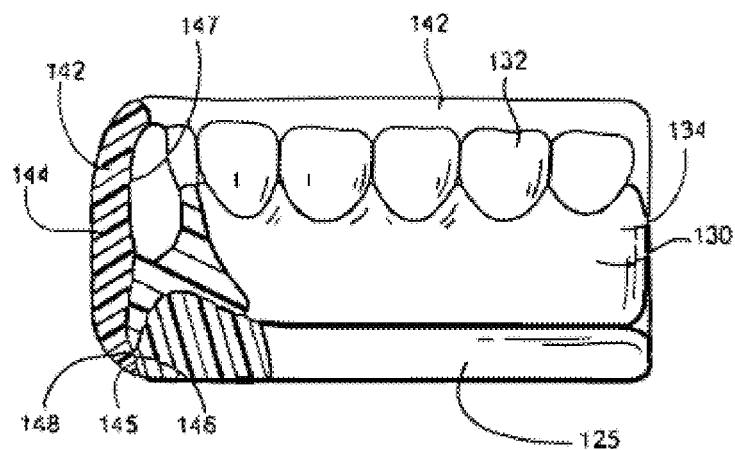
FIG. 9A is a cross sectional view of the stone cast of FIGS. 5-8 taken at section line 9-9 in FIG. 8.
Figure 9B:
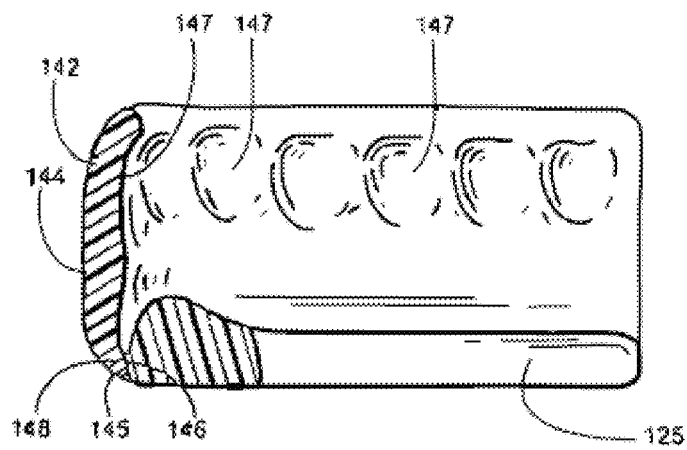
FIG. 9B is a cross sectional view of the stone cast of FIGS. 5-8 with the diagnostic wax-up removed to show the inner surface of the putty index and the impression of the facial aspect of the diagnostic wax-up formed on the inner surface of the putty index.
Figure 10A:
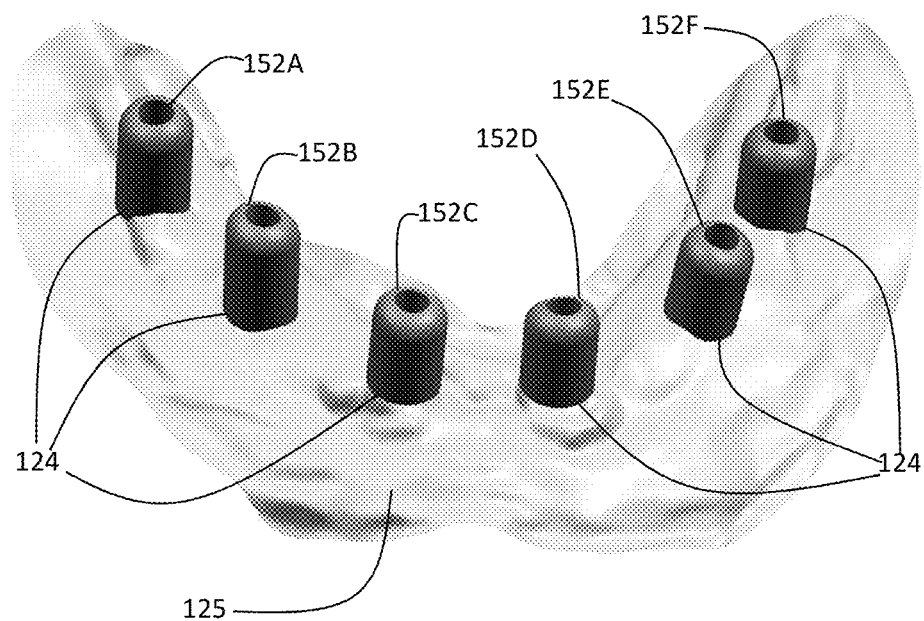
FIG. 10A is a perspective view of the stone cast of FIGS. 5-9B with six fittings, one fitting attached to each of the six analogs.
Figure 10B:
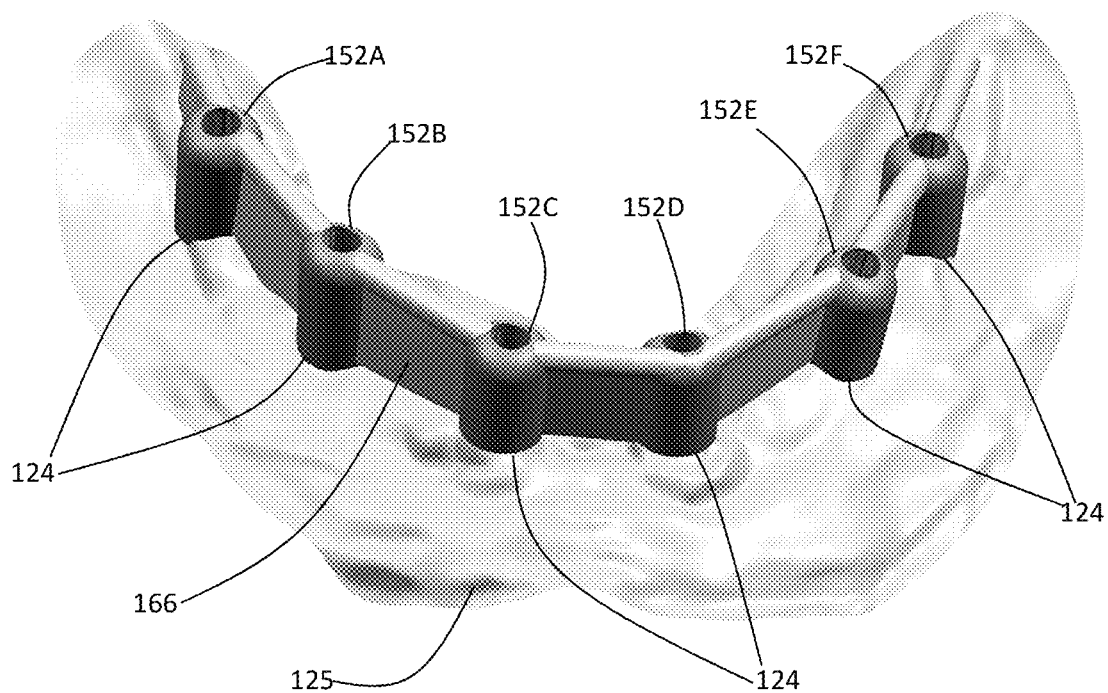
FIG. 10B is a perspective view of the acrylic model of the framework where bridging structures have been added between each of the six fittings attached to the six analogs.
Figure 11:
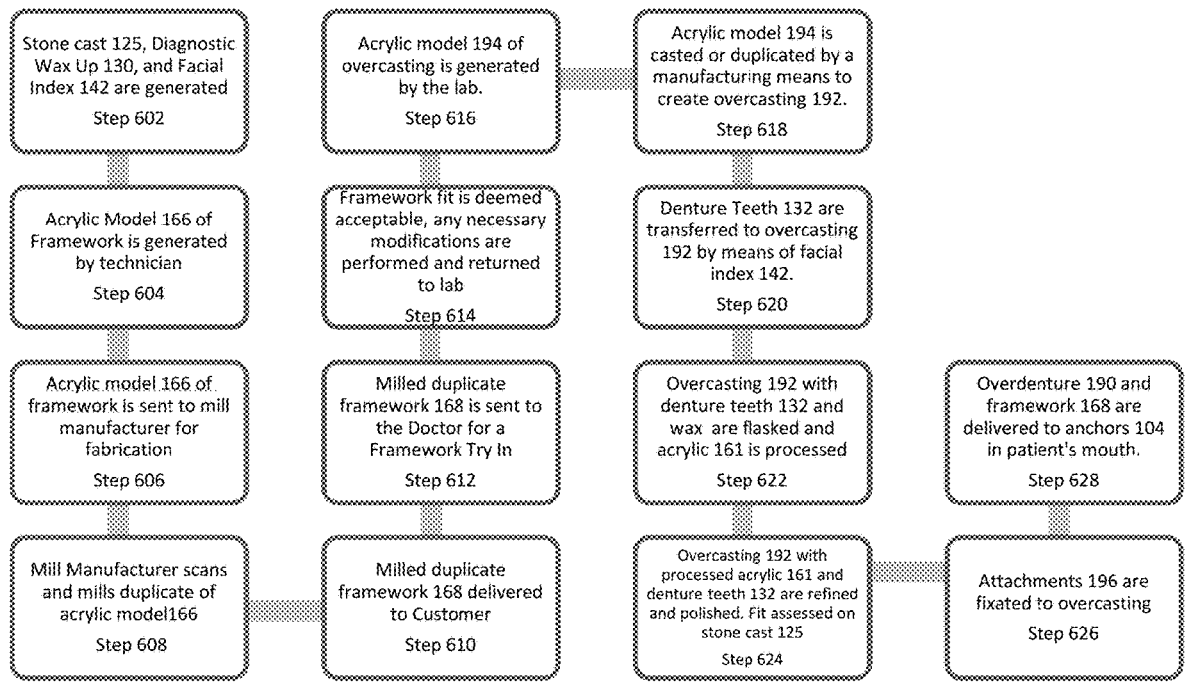
FIG. 11 is a flow chart demonstrating the steps necessary for fabricating a framework for an overdenture through a "copymill" procedure.

The steps associated with the traditional removable prosthesis process are outline in flowchart 600 of FIG. 11. As noted in STEP 604 of Flowchart 600, the Dentist or technician will begin to fabricate an acrylic model of the framework that will be duplicated in a material such as titanium, cobalt chrome, zirconia, or any other appropriate dental material. The first step in this process is creating a facial or putty index of the diagnostic wax-up 130 while positioned on stone cast 125, which captures the facial/buccal contours of the denture teeth 132 including their height and angulation and the soft tissue contours of the diagnostic wax-up. FIGS. 8 and 9A-B illustrate the process of creating the facial index. FIG. 8 shows the facial index 142 as created using stone cast 125 and diagnostic wax-up 130. This facial index 142 is created by wrapping a silicone putty material 144 commonly used in the dental industry around the facial/buccal aspect of the diagnostic wax-up 130 while it is properly positioned on stone cast 125. The facial index will engage a significant area of the stone cast 125 that is not covered by diagnostic wax-up 130. The facial index 142 will have a unique stone mating area 145 that will allow for the facial index to be properly positioned back to stone cast 125 without the aid of diagnostic wax-up 130. FIG. 9A is a cross-sectional view through the facial index 142, stone cast 125, and diagnostic wax-up 130, demonstrating the capturing of the buccal aspect of denture teeth 132 and the gingiva contours of diagnostic wax-up 130. This cross-section is taken at section line 9-9 in FIG. 8. Once the putty material 144 has set the facial index 142 and diagnostic wax-up 130 can be removed from the stone cast 125. FIG. 9B shows the negative impressions 147 left by the facial/buccal contours of denture teeth 132. The facial index 142 will be placed back onto the stone cast 125 utilizing the unique stone mating areas 145. The dentist or technician will utilize facial index 142 as a guide to begin building the acrylic model of the intended framework. As demonstrated in FIG. 10A, wax copings or fittings 152A-F will be attached to the mating surface of the analogs 124 and begin stacking acrylic material 160 on top of them to begin forming the design. The acrylic material 160 can be a light-cured or cold-cured resin commonly used in dentistry. The doctor and technician can also use plastic replicas of a particular bar design (i.e. Hader Bar, Dolder bar etc.) along with the acrylic to aid in the acrylic design process. The dentist or technician will design retention and/or mating structures into the design of the acrylic model 166 of the framework to retain and support the overdenture 190. It can also be appreciated that materials other than acrylic such as wax can be used in creating the design of the framework by the dentist or technician. Frequently the dentist or technician will utilize a hand piece and bur to reduce and refine the contour of the acrylic material 160 in order to create the appropriate contours for the acrylic model 166 of the framework. Depending upon the how overdenture 190 will be retained onto the framework, the design will be adapted per the dentist or technician to provide the necessary strength and support against the expected occlusal forces of the patient. Retention features will also be included in the design of the framework by the dentist or technician. These retention features will work in conjunction with an attachment that has been fixated to the overdenture. The retention feature and attachment will be designed with a mechanical retention design, such as an undercut to allow for the fixation and release of the overdenture to the framework with an appropriate level of pressure applied by the patient or dentist. Alternatively, the retention features can be added to the framework after fabrication, such as the Locator or ERA. In these instances, premanufactured attachments are added by means of a threaded hole, mechanical retention, cement, acrylic, etc.

Once the acrylic model 166 of the framework is deemed acceptable the dentist or technician will send the acrylic model 166 and stone cast 125 to a laboratory or framework supplier to have the acrylic model duplicated in the material of their choosing. Alternatively, the acrylic model 166 can be casted utilizing a lost wax casting technique common to the industry. These STEPS 606, 608, and 610 are noted in Flowchart 600 shown in FIG. 11. The laboratory or framework supplier will scan the stone cast 125 to determine the orientation and location of the mating surfaces of analogs 124 and scan the acrylic model 166 to capture the contours designed by the dentist or the technician. Once an appropriate rendering of the acrylic model 166 has been generated, a tool path will be generated for fabricating the framework out of the appropriate material. The laboratory or framework supplier can use a number of manufacturing methods, such as milling, 3D printing, laser sintering, ceramic pressing, EDM (electric discharge manufacturing), etc . . . , in a multitude of dental materials commonly used in dentistry, such as titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . to fabricate the resulting framework. It can also be appreciated that the dentist or technician may also possess the scanning and/or fabrication equipment necessary to perform these tasks or a portion of these tasks internally within their own facility.

Once the acrylic model 166 of the framework has been duplicated in the appropriate material the duplicate framework 168 and stone cast 125 are returned to the dentist or technician. As noted in STEPS 612 and 614, the duplicate framework 168 is placed in the patient's mouth onto anchors 104 and reviewed for fit and to ensure the duplicate framework 168 has the appropriate contours necessary for the removable dental prosthesis.

At this point in the process, the dentist and technician can choose to proceed with designing and fabricating an overcasting 192 for the case. The overcasting is a structure that fits over the framework and provides a more intimate fit to the framework and a path of insertion for the overdenture onto the framework allowing for easy retrieval and insertion of the overdenture by the patient. In a similar fashion as described for the duplicate framework 168, the technician or dentist will use acrylic material 160 to create an acrylic model 194 of the overcasting that will seat on top of the duplicate framework 168. The dentist or technician will design macro retention features for the acrylic that will be processed to attach the denture teeth 132 to the overcasting 192. Also recesses may be designed where attachments 196 in the form of housings, inserts or clips can be fixated and that will ultimately retain the overcasting and overdenture to the duplicate framework 168. The acrylic model 194 of the overcasting can be casted utilizing a lost wax casting technique common to the industry. Alternatively the overcasting can be fabricated utilizing CAD/CAM technology by a number of manufacturing methods, such as milling, 3D printing, laser sintering, ceramic pressing, EDM (electric discharge manufacturing), etc. . . . , in a multitude of dental materials, such as titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . . In the CAD/CAM process, the overcasting can be designed by scanning the acrylic model of the overcasting or can be designed utilizing an appropriate CAD software on the basis of a scan of the duplicate framework 168. It should be noted that the overcasting is not required but more of a preference of the doctor and technician. If the dentist and technician do not use an overcasting, the dentist and technician will process the housings, clips and inserts directly into the acrylic portion of the overdenture.

The dentist and technician will now proceed with processing the overdenture 190 for the removable prosthesis. For cases utilizing the an overcasting, the dentist and technician will transfer the denture teeth 132 from diagnostic wax-up 130 to the overcasting and replicate the gingiva contours first created in the diagnostic wax-up 130. The dentist and technician will use the facial index 142 and stone cast 125 for this process. The technician will position the denture teeth 132 into the facial index 142 and review the position and clearance between the underside of the denture teeth and the top surface of the overcasting. If necessary the technician will adjust the underside of the denture tooth and the top surface of the overcasting to create the required space for the acrylic that will adhere the denture tooth to the overcasting. The technician will then utilize wax to fixate the denture tooth to the overcasting 192. The technician will also use the wax to create the necessary gingiva and mucosal tissue contours (here in after referred to as gingiva contours) for the overdenture. Once all of the denture teeth have been attached and the gingiva contours have been created in wax, the technician will flask the overcasting 192 with denture teeth and wax into a stone material. Once the stone material has set the wax will be boiled out. The denture teeth 132 and overcasting 192 will be steamed to remove any residual wax and returned to the stone flask. Acrylic 161 will be poured, injected or packed into the stone flask and allowed to cure. Acrylic 161 will have a color similar to that of the patient's gingiva, traditionally some shade of pink. Once fully cured, the overcasting 192 with processed acrylic 161 and denture teeth 132 will be removed from the stone cast and the contours will be refined and polished. The fit of the overcasting with processed acrylic and denture teeth will be reviewed against the stone cast 125 with duplicate framework 168 attached. If necessary the technician will adjust the overcasting 192 or processed acrylic 161 to ensure an appropriate mating relative to the duplicate framework 168 and soft tissue contours of stone cast 125. The dentist and technician will proceed with fixating the attachments, i.e. housings, inserts and/or clips, to the overcasting with processed acrylic and denture teeth. Typically, the dentist or technician will utilize a cold-cure acrylic 161' or chairside material for attaching these housings, inserts and/or clips. This process can be done utilizing the duplicate framework 168 attached to stone cast 125 or the dentist can choose to place the duplicate framework 168 onto anchors 104 in the patient's mouth and attach the housings, inserts and/or clips intraorally. The housings, clips, and/or inserts 196, overcasting 192 with processed acrylic 161 and 161' and denture teeth 132 provide the complete embodiment of the overdenture 190.

For cases where an overcasting will not be utilized, the technician will modify the underside of the diagnostic wax-up 130 to enable it to seat over the duplicate framework 168 when attached to analogs 124 in stone cast 125. The technician will create a recess on the underside of diagnostic wax-up 130 to ensure it seats on the soft tissue contours replicated in stone cast 125. The technician will create a duplicate stone of the stone cast 125 with the duplicate framework 168 attached to the analogs 124. The technician will flask the duplicate stone with the modified diagnostic wax-up in a stone material. Once the stone material has set the wax will be boiled out. The denture teeth and duplicate stone will be steamed to remove any residual wax and returned to the stone flask. Acrylic 161 will be poured, injected or packed into the stone flask and allowed to cure. Once fully cured, the processed acrylic 161 and denture teeth 132 are removed from the stone flask, contoured and polished. Acrylic 161 will replicate the gingiva contours of diagnostic wax-up 130 that were designed in wax. The technician will review the fit of the processed overdenture on the stone cast 125 with duplicated framework 168 attached. If necessary, the technician will adjust the recess and processed acrylic to ensure proper seating over the duplicate framework 168, to create space necessary for the attachments, i.e. housings, inserts and/or clips, and to ensure appropriate seating on the soft tissue contours of the stone cast 125. The dentist and technician will proceed with fixating the attachments (housings, inserts and/or clips) 196 to the processed acrylic and denture teeth. Typically the dentist or technician will utilize a cold-cure acrylic 161' or chairside material for attaching these housings, inserts and/or clips. This process can be done utilizing the duplicate framework 168 attached to stone cast 125 or the dentist can choose to place the duplicate framework 168 onto anchors 104 in the patient's mouth and fixate the attachments (housings, inserts and/or clips) 196 intraorally. The attachments (housings, clips, and/or inserts) 196, processed acrylic 161 and 161' and denture teeth 132 provide the complete embodiment of the overdenture 190.

Once overdenture 190 and duplicate framework 168 are completed, the dentist will attach the duplicate framework 168 to the anchors in the patient's mouth (usually by means of a screw or cement) and seat the overdenture 190 over the duplicate framework 168. The dentist will review and adjust the occlusion if necessary before letting the patient leave.

In addition to duplicating an acrylic model 166 of the framework, the dentist or technician can utilize a process as outlined in U.S. Pat. No. 8,100,692, where the framework is digitally designed on the basis of the soft tissue contours of stone cast 125 and position of the denture teeth and gingiva contours of diagnostic wax-up 130. This process alleviates the need for an acrylic model of the framework and due to the buccal and lingual boundaries of the prosthesis, provides an improved framework design.

Figure 12A:
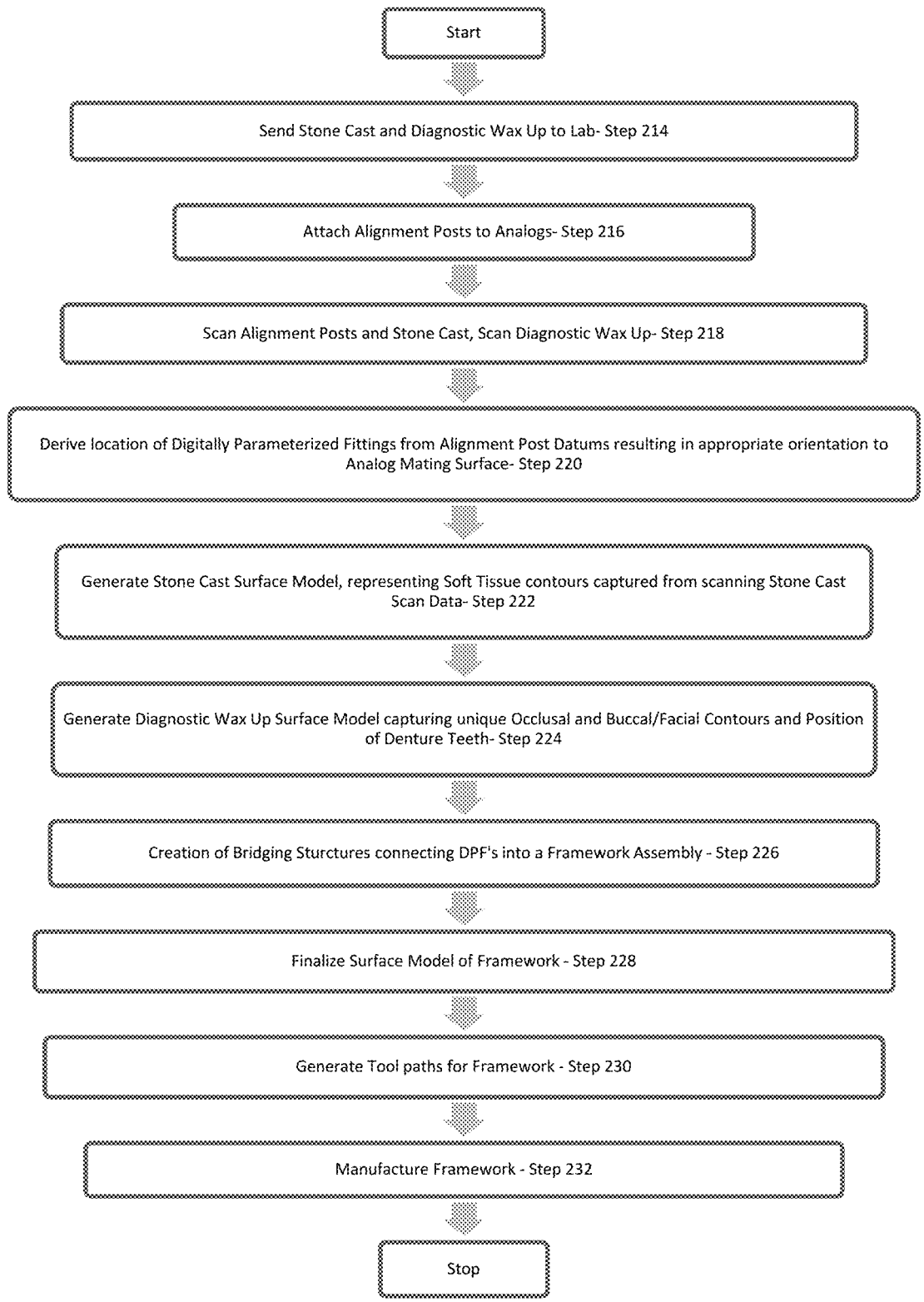
FIG. 12A is a flow chart demonstrating the steps for designing and fabricating an implant framework per U.S. Pat. No. 8,100,692.

In creating an implant framework supporting an overdenture, the dentist and/or technician will create a stone cast 125 and diagnostic wax-up 130 as previously discussed. It is from these elements where the framework will be designed. First, a digital scan of the stone cast 125 utilizing the alignment posts 156 attached to the analogs 124 as detailed in U.S. Pat. No. 8,100,692, is conducted. This process will determine the exact location of the critical mating geometries and their correlation relative to one another as well as relative to the soft tissue contours captured in the stone cast. As demonstrated in FIG. 12A, in step 214 of the process, the dentist sends the stone cast 125 and diagnostic wax-up 130 to the laboratory. In step 216, the laboratory inserts alignment posts 156 into the analogs 124 embedded in the stone cast 125. These alignment posts 156 are configured to engage the mating surfaces of analogs 124 and hold the alignment posts coaxial with the longitudinal axis of analogs 124. They may have differently shaped flat, frusto-conical and cylindrical surfaces configured to engage with the mating surfaces of analogs 124. The alignment posts 156 used in this process have two spherical surfaces comprising centers coaxial with analog 124. These alignment posts need not have spherical surface portions, but may have any predetermined geometric shape as deemed suited by the user. This process also encloses the use of a single gauge; however it can be appreciated that a series of gauges could be used instead of a single embodiment to achieve the same result.

The mating surfaces on the alignment posts and the mating surfaces on the analogs 124 inter engage to cause the alignment posts 156 to be aligned coaxial with analogs 124. The alignment posts 156 cover the free ends of the analogs 124 exposed in stone cast 125.

Figure 13:
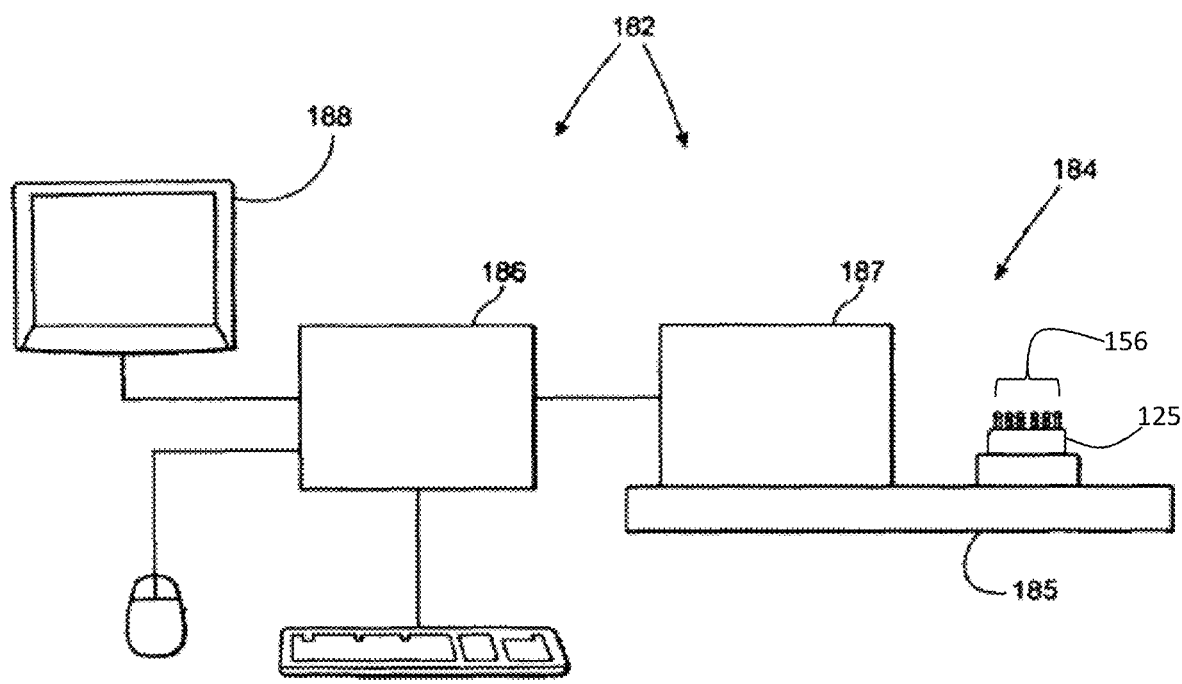
FIG. 13 is a schematic diagram of the scanner and the stone cast and alignment posts that it is scanning.

In step 218, once the alignment posts 156 have been attached to the analogs 124, the scanner 182 is configured to scan the alignment posts and the soft tissue replica of the patient's mouth formed in the surface of the stone cast 125, and the alignment posts 156. The surfaces of stone cast 125 that are scanned by scanner 182 (depicted in FIG. 13) include the surfaces of the stone cast that replicate the mucosal tissue in the patient's mouth. Scanner 182 stores in the memory of computer 186 a first point cloud dataset of the stone cast 125 with alignment posts 156 attached. In step 218, scanner 182 also scans the surface of diagnostic wax-up 130 and the surface of stone cast 125 (preferably when they are assembled) and saves a second point cloud dataset collectively representing the scanned surface of the diagnostic wax-up 130 and stone cast 125. Alternatively, the operator can scan the diagnostic wax-up 130 separately from the stone cast and later register the point cloud dataset of the stone cast 125 and the diagnostic wax-up 130.

If the diagnostic wax-up 130 is scanned on the stone cast 125, the scan preferably includes data points taken from all the exposed external surfaces of the diagnostic wax-up 130 (i.e. the outwardly facing surfaces that model the gum and the teeth) as well as surfaces of the stone cast 125 adjacent to the diagnostic wax-up 130. The surfaces of the stone cast 125 adjacent to the diagnostic wax-up that are scanned in the second point cloud dataset are also preferably scanned in the first point cloud dataset and thus there is some overlap in surface contours in both the first and the second point cloud datasets—both datasets include data points scanned from the same surfaces of stone cast 125. This permits later registration of the first and second point cloud datasets.

If the diagnostic wax-up 130 is scanned when it is separate from the stone cast 125, it is preferably scanned so that the second point cloud dataset includes data points taken from all the exposed external surfaces of the diagnostic wax-up 130 (i.e. the outwardly facing surfaces that model the gum and the teeth) as well as surfaces of the diagnostic wax-up 130 that would abut stone cast 125 if the diagnostic wax-up 130 was mounted on the stone cast. Since the diagnostic wax-up 130 was formed by molding a plastic (or wax or acrylic) material to the surface of the stone cast 125, the scanned surface contour of the diagnostic wax-up 130 that abut the stone cast are a mirror image of surface contours of the stone cast 125.

In the preferred embodiment, these abutting stone cast 125 surfaces were scanned previously and are a part of the first point cloud dataset. Thus, the first and second point cloud datasets include a subset of data points taken from mirror image surface contours—surface contours common to both the first and second point cloud datasets—common to the diagnostic wax-up 130 and to the stone cast 125. This permits later registration of the first and second point cloud datasets.

In step 220, computer 186 determines the location and orientation of the alignment posts as they are attached to analogs 124 in the stone cast 125. Computer 186 sequentially selects a digital parameterized fitting 152" from its internal library and aligns the mating surface (or surfaces) and axis of the selected digital parameterized fitting 152" with the surface (or surfaces) and axis of one of the analogs based upon datums derived from the alignment posts 156. Computer 186 repeats this process for each additional analog 124 whose location and orientation were determined in step 220, until it has built up an initial surface model of dental framework 324.

In step 222, a surface model of the unique contours of stone cast 125 is created which is a representation of the soft tissue contours in the patient's mouth. The stone cast surface model 320 will provide a lower limit to which the framework can be designed to.

In step 224, a surface model of the unique contours of diagnostic wax-up 130 is created which is a representation of the proposed prosthesis for the patient. The diagnostic wax-up surface model 322 contains the unique buccal/facial and occlusal contours of the denture teeth 132. The diagnostic wax-up surface model 322 will provide the necessary information regarding the orientation of the individual denture teeth 132 as they are positioned relative to one another within diagnostic wax-up 130. The diagnostic wax-up surface model will also capture any unique gingiva contours as designed by the dentist or technician.

The surface models 320 and 322 can be the raw point clouds derived from the scan data of the stone cast 125 and diagnostic wax-up 130 or can be a sheet body, where a surface has been wrapped across the raw point clouds. These models can also be closed surface models, allowing for Boolean Unite and Subtract Operations to be performed utilizing these models or other CAD bodies.

The two sets of scan data and resulting surface models of the stone cast 125 and diagnostic wax-up 130 provide all of the necessary data for determining the position of the denture teeth 132 in diagnostic wax-up 130 relative to the implants and abutments and the soft tissue contours of stone cast 125 as well as defining the boundaries or limits in which the framework should be designed within.

In step 226, the computer 186 is configured to generate a surface model of bridging structure 154' that will join the digital parameterized fittings 152". This includes the computer 186 determining the cross-sectional shape, length and location of the bridging structures as described below. The user can select from a number of standard framework designs commonly used in the marketplace (i.e. Dolder, Hader, Locator) or choose to create a unique framework cross-section design ideal for the case. This surface model of this bridging structure 154' extends between and joins the digital parameterized fittings 152" and thereby completes the surface model of the dental framework 324. Bridging structure 154' also comprises the portions 155 that extend away from the end digital parameterized fittings 152" and are supported only at one end.

To generate bridging structure 154', computer 186 determines the shape, length, and location of the individual portions of the bridging structure to attach digital parameterized fittings 152". It is further configured to determine the shape, length and location such that the individual portions will not intersect the stone cast surface model 320. Since the surface of the stone cast 125 represents the exposed surfaces (including mucosal tissue) in the patient's mouth, this reduces the likelihood that the physical framework created from the surface model will contact and damage the patient's mucosal tissue. Computer 186 is configured to provide a separation distance between the surface model of the stone cast and the bridging structures. In one arrangement the computer 186 is configured to place the bridging structures a predetermined minimum distance from the surface model of the stone cast. In another arrangement the computer is configured to permit the operator to select a desired minimum distance between the bridging structure and the stone cast surface model 320. In another arrangement, the computer is configured to offer to and/or accept from the operator only a certain range or number of minimum separation distances, such minimum separation distances preferably ranging between 0.1 mm and 5 mm.

Computer 186 is configured to create the bridging structure by providing a pre-designed list of bridging structure forms (e.g., a cylinder, circle, ellipse, square, Hader, Dolder, Locator, polygon or other geometric shape) that have been previously stored in the electronic memory of the computer. In one configuration, the computer is configured to automatically select the cross sectional dimensions of each form (diameter, radius, major and minor diameter, height, width, etc.). In another configuration the computer is configured to present the user with a list of pre-set values or defined by the user among which the user can select preferred dimensions. In yet another configuration, the computer is configured to prompt the user to enter specific numeric values for these dimensions. The form of the bridging structures can also be defined by the user. For frameworks intended for supporting and retaining an overdenture, retention features will be incorporated into the design of the bridging structures. Additionally the computer or operator can identify areas where prefabricated retention features can be attached to the bridging structures by means of a threaded hole, mechanical fit, friction fit, weld, cement, adhesive, composite or acrylic.

Computer 186 is configured to determine the proper location of the bridging structure 154' extending between the digital parameterized fittings 152" by locating the beginning and end of each structure according to position information that is derived from the scanned point cloud dataset of the alignment posts. Position of the bridging structure can also be determined by the operator or from the point cloud data set of the stone cast and/or diagnostic wax-up.

In another arrangement, the computer 186 is configured to determine the location of the bridging structure 154' extending from each of the digital parameterized fittings 152" by locating the beginning and end of each structure according to reference points and axes assigned to the digital parameterized fittings 152" by the computer program from a list of pre-set values or defined by the user. For example, each digital parameterized fitting 152" which is placed in the model may have only certain types of bridging structures to which they can be connected, and may only connect to those bridging structures at certain locations on the digital parameterized fitting. This information is stored in the electronic memory of computer 186 in association with each digital parameterized fitting. When a particular fitting is inserted into the model, computer 186 is configured to the type and location information associated with the inserted fitting and locate (or permit the operator to locate) bridging structures of the type and at the locations compatible with those fittings. This process can also ensure the bridging structure does not extend into critical mating areas of digitally parameterized fitting 152" that would affect the potential fit of the implant/abutments to the framework. In the case of distal extensions 155, computer 186 is configured to cantilever them off the digital parameterized fittings 152" and extend them distally along the arch of the patient's mouth. These distal extensions 155 are preferably 20 mm in overall length or less. They are also selected as described above and can also include the above described retention features.

Computer 186 is configured to conduct a mechanical design analysis of the distal extensions 155 that validates shear and bending strength limits for those geometries relative to their chosen material and shapes. Computer 186 is configured to apply the appropriate shear, tensile and compressive stress analysis techniques to the chosen geometries automatically or from a predetermined list of tests chosen by the user. Upon successful analysis of the distal extension designs, the extensions are verified or accepted by the user.

As part of the step of generating the bridging structure 154' computer 186 is configured to determine a location for the bridging structure 154' that will not intersect the diagnostic wax-up surface model 322. This ensures that the bridging structure 154' of the final denture framework will not stick through, but will be disposed within, the body of the diagnostic wax-up 130.

It can be appreciated that all of the disclosed steps being performed by computer 186 can be performed manually by the Operator. The Operator can also determine the use of any number of custom geometries or series of geometries to be used for the bridging structure 154' and distal extensions 155.

Upon completion of the bridging structures 154' and distal extensions 155, the final surface model of the framework 324 is complete. The final surface model of the framework will consist of fittings 152", bridging structures 154' and distal extensions 155 (including retention features).

In STEP 230, tool paths are generated for the surface model of the framework 324. The framework can be manufactured in the chosen dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ) and through the preferred manufacturing process (milling, laser sintering, 3D printing, EDM, etc. . . . ).

Once the framework has been manufactured, it is delivered to the dentist and/or technician for the creation of the overdenture. The overdenture will be fabricated in a similar means as earlier described and may or may not include the use of an overcasting. The overcasting may be cast utilizing a lost wax technique or alternatively the overcasting can be fabricated utilizing CAD/CAM technology by a number of manufacturing methods, such as milling, 3D printing, laser sintering, ceramic pressing, EDM (electric discharge manufacturing), etc . . . , in a multitude of dental materials, such as titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . . In the CAD/CAM process, the overcasting can be designed by scanning the acrylic model of the overcasting or can be designed utilizing an appropriate CAD software on the basis of a scan of the duplicate framework 168.

The above disclosed process utilizes a traditional diagnostic wax-up 130 and stone cast 125, which provided the position of the implants and abutments in the patient's mouth, denture teeth 132 and soft tissue contours. In the first alternate embodiment of the process, the use of a virtual set up is used in place of the diagnostic wax-up 130. There are currently multiple dental systems and software (such as 3Shape, Dental Wings, Avadent and Procera) which have the ability to lay in CAD models of denture teeth or stock teeth relative to scans of a stone cast and an opposing dentition. For this first alternate process, the stone cast and opposing cast would be scanned separately and then scanned in their proper orientation relative to one another. Utilizing the scan capturing the orientation of the stone cast and opposing cast, the scan data of the stone cast and opposing cast will be properly aligned to one another. Once properly aligned, the CAD models of the denture teeth or stock teeth will be positioned or surfaces adjusted relative to the occlusion of the opposing cast. Once the position of the CAD models of the denture teeth or stock teeth have been finalized, the operator can generate a CAD model of the gingiva contours. Using digital waxing tools, the Operator can design the appropriate gingiva contours for the digital set up, very much in a similar fashion as a technician or dentist would contour the wax contours of diagnostic wax-up 130. This information can then be used in designing the framework. This process may be advantageous over the previously described process as it alleviates the dentist and/or technician from having to create the diagnostic wax-up. Also, if the CAD models of the denture teeth, stock teeth and gingiva are truly parametric, the operator can modify the design of the occlusal contours and buccal contours to meet any unique design requirements for the dentist.

In the second alternate process, the scanning process for capturing the implant and abutment positions is altered by the use of an intra-oral scanner that would directly capture the implant (anchors) and/or abutment locations in the patient's mouth along with the gingiva contours. The intra-oral scanner can also capture the contours of a diagnostic wax-up, existing prosthesis or an interim prosthesis that has been placed in the patient's mouth or the position and orientation of the opposing arch during the scanning process. From this digital data, the dentist or technician can identify the appropriate location of the digitally parameterized fittings 152". This process would alleviate the dentist or technician from being required to create an impression or stone cast.

In a third alternate process, the dentist or technician can utilize a CT scan or series of CT scans for the basis of determining the appropriate position of the digitally parameterized fittings 152". The dentist or technician can use the CT scan data for determining or planning the position of the implant locations and ultimately the position of the digitally parameterized fittings 152". The use of a radiographic stent demonstrating the ideal tooth position for the restoration can also be included in this process and provide the dentist and technician with an ability to align the CAD models of denture teeth or stock teeth relative to the contours of the radiographic stent or relative to the position of the opposing arch. The dentist or technician could also utilize a CT scan of the patient's previous existing dentition, which could be aligned utilizing anatomical markers, in order to determine the ideal design of the framework.

These alternate embodiments only demonstrate some of the potential options in combining different digital data acquisition protocols into the invented process. As can be appreciated, these are only a handful of potential embodiments of the invented process, but should provide insight as to the adaptation of future technologies.

It can be appreciated the level of work and skill required in fabricating the framework, overdenture and optionally the overcasting. The overcasting improves the accuracy of fit of the overdenture onto the framework but can create issues in cases with smaller vertical dimensions or restorative space. In cases with reduced vertical dimension the overcasting reduces the volume of acrylic attaching the denture teeth, thereby reducing the amount of force required to break the bond between the denture teeth, acrylic and overcasting. The acrylic only achieves a mechanical bond to the overcasting. Even in cases with more normalized vertical dimensions, the bonding layers between the acrylic, denture teeth and overcasting create the weak link in the prosthesis. The same can be said for cases where an overcasting is not utilized. The bond between the denture teeth and acrylic is ultimately the weak bond and typically the area of breakage for these types of restorations. The overcasting also increases the overall cost of the prosthesis due to the additional time and materials. An improved process and design for a framework and overdenture prosthesis is required for reducing breakages (especially in smaller vertical dimensions), improving fit and reducing the cost of these types of restorations.

Figure 12B:
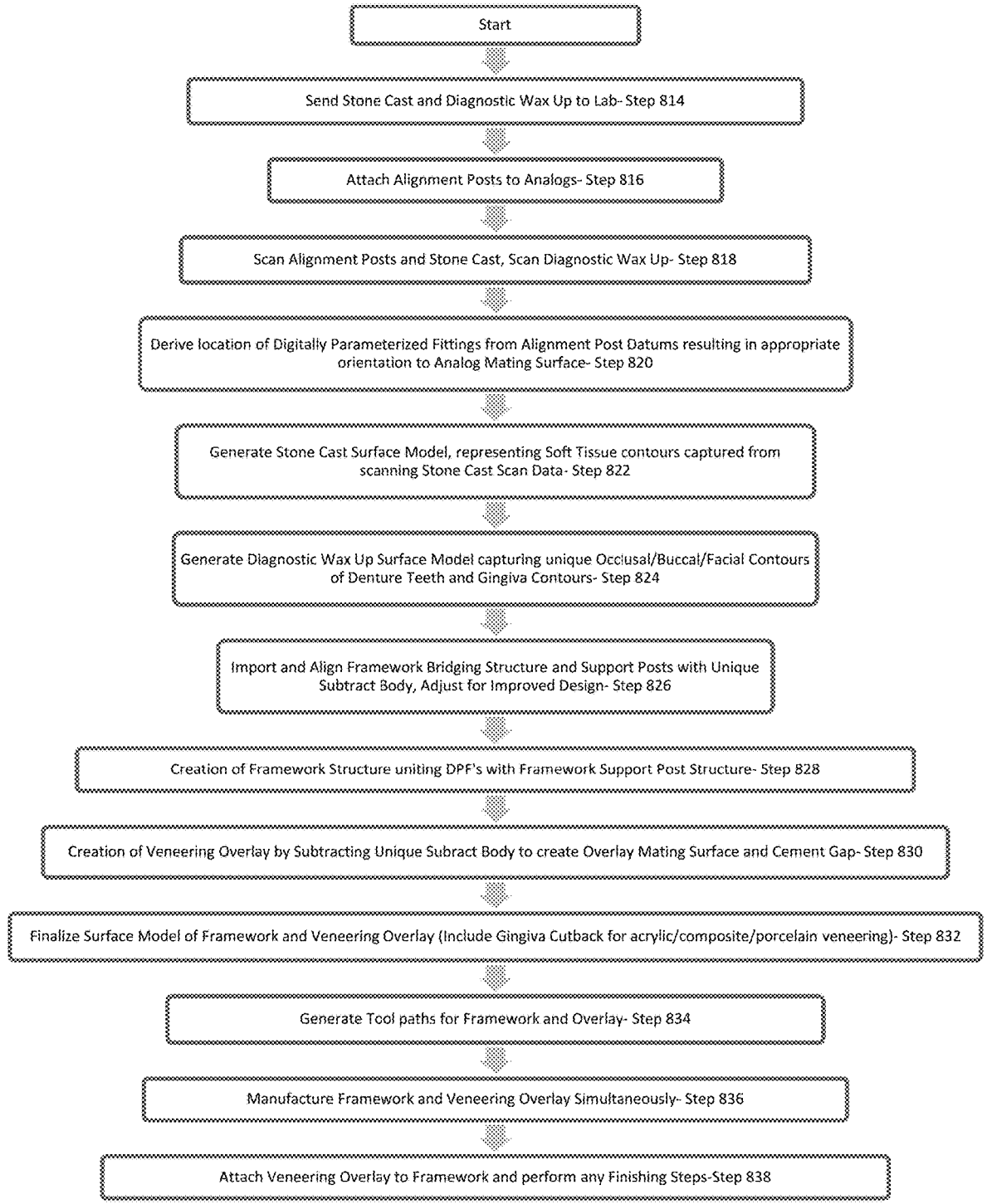
FIG. 12B is a flow chart demonstrating the steps for designing a prosthesis and framework per application Ser. No. 15/068,423.

In application Ser. No. 15/068,423 the inventor disclosed an invention consisting of a framework fabricated from a dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ) that supports a veneering overlay consisting of a second dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ). FIG. 12B outlines the steps for designing and fabricating the preferred embodiment of the invention. Similar to the process disclosed in U.S. Pat. No. 8,100,692, alignment posts 156 are attached to the analogs 124 of stone cast 125 and scanned where computer 186 determines the location and orientation of the alignment posts and sequentially selects and aligns digital parameterized fitting 152" based upon datums derived from the alignment posts 156. Diagnostic wax-up 130 is also scanned either properly positioned on stone cast 125 or separately and then aligned to stone cast 125 utilizing the surface contour of the diagnostic wax-up 130 that abut the stone cast as they are a mirror image of surface contours of the stone cast 125. When the diagnostic wax-up is scanned it is critical to capture the contours of the denture teeth and gingiva as these contours will be replicated in the veneering overlay. Surface models of the stone cast (320) and diagnostic wax-up (322) are generated on the basis of the scan data. These surface models are constructed in such a way as to allow for Boolean Unite, Subtract, and Trim Operations to be performed utilizing these models or other CAD bodies. The above listed processes are outlined in Steps 814-824 of FIG. 12B.

Figure 14A:
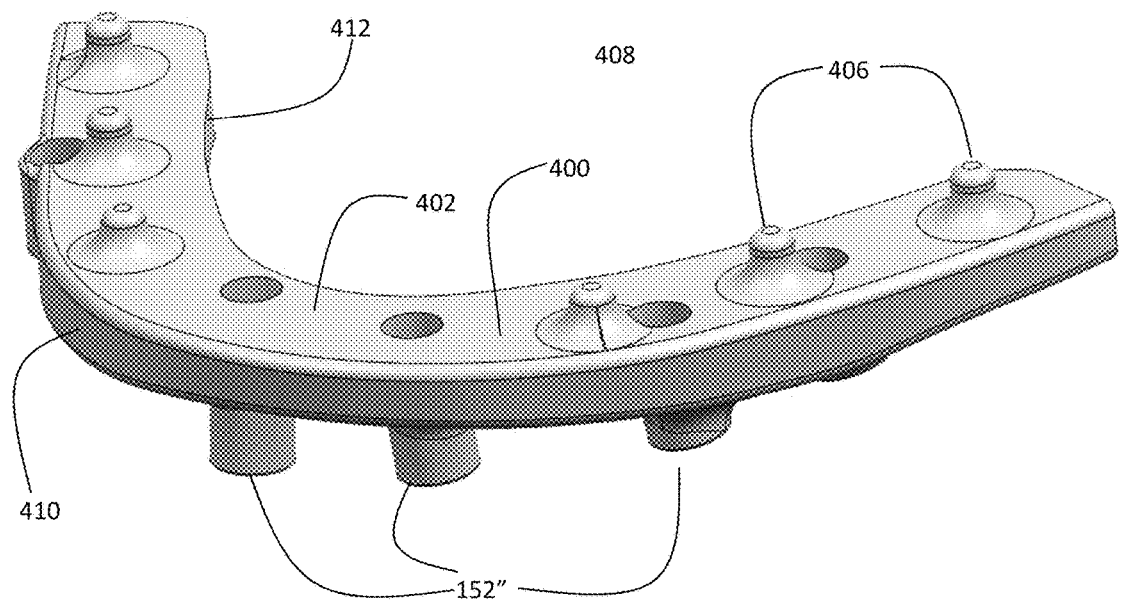
FIG. 14A is a perspective view of the framework designed to support the veneering overlay.
Figure 14B:
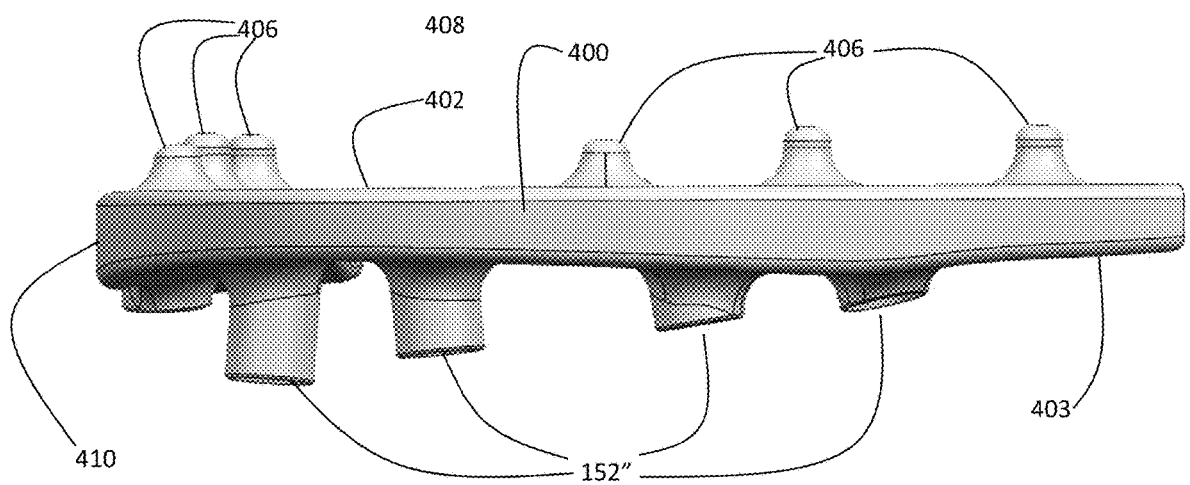
FIG. 14B is a side view of the framework designed to support the veneering overlay.

Once all of the scan data, surface models (320 and 322) and digital parameterized fittings 152" have been aligned properly to one another, computer 186 imports and appropriately aligns framework bridging structure 400 relative to the digital parameterized fittings 152", stone cast surface model 320 and diagnostic wax-up surface model 322 as noted in STEP 826. This step can also be performed manually by the operator. The framework bridging structure 400 consists of a predefined cross-section and possesses parametric attributes allowing for any portion of the framework bridging structure to be adaptable to the unique contours of the diagnostic wax-up and stone cast surface models. In the preferred embodiment the framework bridging structure consists of a rectangular cross-section and can vary in height and length depending upon the contours of the surface models 320 and 322. In some areas the bar may be taller than others due to the changes in the patient's soft tissue that are captured in the stone cast surface model 320. In other areas the bar may be wider than others due to the varying contours of the diagnostic wax-up surface model 322. Frequently the width of the diagnostic wax-up 130 is greater in the posterior regions, where the molar teeth reside in comparison to the anterior where you will find the incisors. Ideally, the top surface of the framework will remain on a single plane, but this top surface can be offset in certain areas due to fluctuations of the vertical dimension in the patient's mouth. This top surface 402 will support and engage the resulting veneering overlay 404. The position and angulation of this top surface 402 can be adjusted automatically by computer 186 or by the operator to meet either the clinical demands for the dentist and technician or for ease in manufacturing. The position of this top surface 402 can be positioned substantially into the area where the denture teeth reside in the diagnostic wax-up 130. This design feature is possible as the veneering overlay 404 will be fabricated from a single monolithic piece. The buccal wall 410 of framework bridging structure 400 will be positioned ideally 1-4 mm from the buccal aspect of the diagnostic wax-up surface model 322. This required clearance allows for an appropriate amount of material to prevent any potential show through of the framework through the veneering overlay 404. The operator or computer will also adjust the bottom surface 403 of the bridging structure to have the appropriate clearance or contact with the gingiva contours as captured in the stone cast surface model 320. The stone cast surface model 320 can also be used as a Boolean CAD Tool to contour the bottom of the bar to match gingiva contours in the patient's mouth by means of a Boolean Subtract operation. In the preferred embodiment of the invention, the buccal wall 410 is typically flat and held at a 90 degree angle relative to the top surface 402. This design aspect provides an ease in milling and fabrication. Obviously, this wall angle could be adjusted to meet the technical demands of the dentist or technician or due to a limitation associated with the case. In the preferred embodiment, the lingual wall 412 of the framework bridging structure 400 will be adjusted to terminate at the lingual boundary of the diagnostic wax-up surface model 322 and can be flush with this boundary. The lingual wall 412 can be flat similar to the buccal wall 410 or even rounded if preferred by the dentist and/or technician. However, using Boolean Unite, Subtract, and Trim Operations in the CAD software the lingual wall 412 can be shaped to exactly replicate the boundary of the diagnostic wax-up surface model 322 and follow the exact lingual contours as created in diagnostic wax-up 130 by the dentist. Alternately, lingual wall 412 can be covered by the veneering overlay 404. FIGS. 14A and 14B depict an embodiment of the framework 408. As demonstrated by these figures, digital parameterized fittings 152" has been united through a Boolean Unite Operation to framework bridging structure 400, as noted in Step 828. In this embodiment, the digital parameterized fittings 152" are substantially within the body of the framework bridging structure 400. In some embodiments these digital parameterized fittings 152" may extend through or slightly out of the framework bridging structure 400.

As part of the framework bridging structure, at least one macro retention feature is included in the design of the framework. In the preferred embodiment, one or more support posts 406 can be positioned on top surface 402. Support posts 406 provide macro retention and resistance against lateral forces between the framework bridging structure 400 and the veneering overlay 404. The support posts 406 can be imported as part of framework bridging structure 400 or imported separately. The preferred design of the support posts 406 is a design consistent with a cylinder, which can be easily milled or fabricated by a known method (laser sintering, 3D Printing, wire EDM, etc. . . . ), but can consist of any number of different cross-sections as desired by the operator, e.g., a cylinder, circle, ellipse, square, polygon or other geometric shape. Instead of support posts 406 being designed on the top surface 402, recesses can also be provided on the top surface 402 and protrusions can be included on the overlay mating surface 402' of veneering overlay 404 to engage these recesses. In addition to the support posts, the design can consist of slots or recesses on the buccal wall 410 or lingual wall 412. Alternatively, protrusions can be provided on the buccal wall 410 or lingual wall 412. In the instance of the slots, recesses or protrusions being placed on the buccal wall 410 or lingual wall 412, the veneering overlay 404 will have the appropriate corresponding geometry to mate with these slots or recesses, which will be created by the same unique subtract body that will be used for fabricating the overlay mating surface 402'. Digital parameterized fittings 152" can also replace the slots and recesses, if the parameterized fittings 152" is slightly larger than the cross-section of the framework bridging structure 400. The operator can also design different sized cross-sections into the framework bridging structure 400, to create these macro retention features. If necessary the operator can extend the surface of the veneering overlay 404 to extend down all or a portion of the buccal wall 410 or lingual wall 412. Macro retention can be created by simply extending the veneering overlay down both the buccal wall 410 and lingual wall 412. These are just a number of examples, obviously other macro retention feature designs can be used for this purpose. The combination of framework bridging structure 400, digital parameterized fittings 152" and the macro retention features (support posts 406 or other retention features) creates the complete embodiment of the dental implant framework 408.

As the framework bridging structure 400 is being designed, the veneering overlay 404 is being designed simultaneously. The veneering overlay 404 is created directly from diagnostic surface model 322, by the use of a Boolean subtract operation and a unique subtract body related to the framework bridging structure 400. As discussed in application Ser. No. 14/272,566 where the crowns, margins, and cement gaps are updated by the repositioning of the PTF or support post, the unique mating surface of the veneering overlay 404 is updated/refined by a unique subtract body that is dependent upon the design features of framework bridging structure 400 and digital parametrized fittings 152" (top surface 402, support posts 406, buccal wall 410, lingual wall 412, slots, recesses etc.). The subtract body creates the necessary overlay mating surface 402' and the appropriate clearance gaps 414 that provide the necessary space and clearance between buccal wall 410, parameterized fittings 152", and protrusions 406 or any of the other aforementioned macro retention features. Clearance around the buccal wall 410, parameterized fittings 152", and protrusions 406 allows for an intimate mating of the overlay mating surface 402' to the top surface 402 of the framework bridging structure 400. This design aspect allows for an appropriate transfer of occlusal forces from the veneering overlay 404 to the top surface 402 of framework bridging structure 400 and ultimately to the dental implants in the patient's mouth. This clearance gap 414 also provides a space where a bonding agent such as cement, acrylic, heat cured bonding agent, chemical bonding agent (epoxy) can be used to permanently retain the veneering overlay 404 to framework 408. The subtract body for veneering overlay 404 can also include bodies for the parameterized fittings 152" and screw access holes 418 to be subtracted from the veneering overlay 404. This design feature allows for the dentist to access the screws retaining the framework to the implants without having to remove the cemented veneering overlay 404. However, at times the dentist may choose to bond the veneering overlay 404 in the patient's mouth either due to aesthetic demand or issue with a screw access hole coming through a buccal aspect of the prosthesis. The previous description describes a design where the veneering overlay 404 is retained to framework 408 by means of a bonding agent, which is the preferred method. Bonding agents, such as cement, allow for the restoration to work in the smallest restorative spaces possible and permanently fixates the veneering overlay to the framework, which allows for the most optimal performance of the restoration in the patient's mouth. It is obvious that other means of retention such as the use of screws, mechanical clamps, or memory alloy clamps (U.S. Pat. No. 8,678,822) could also be used in retaining the overlay to the framework if space allows, but these mechanical retention means can deteriorate over time and be costly to replace. If a mechanical retention means is used, the dentist or technician would still want to apply a material (silicone) that would seal the clearance gap between the veneering overlay 404 and framework 408.

Figure 15A:
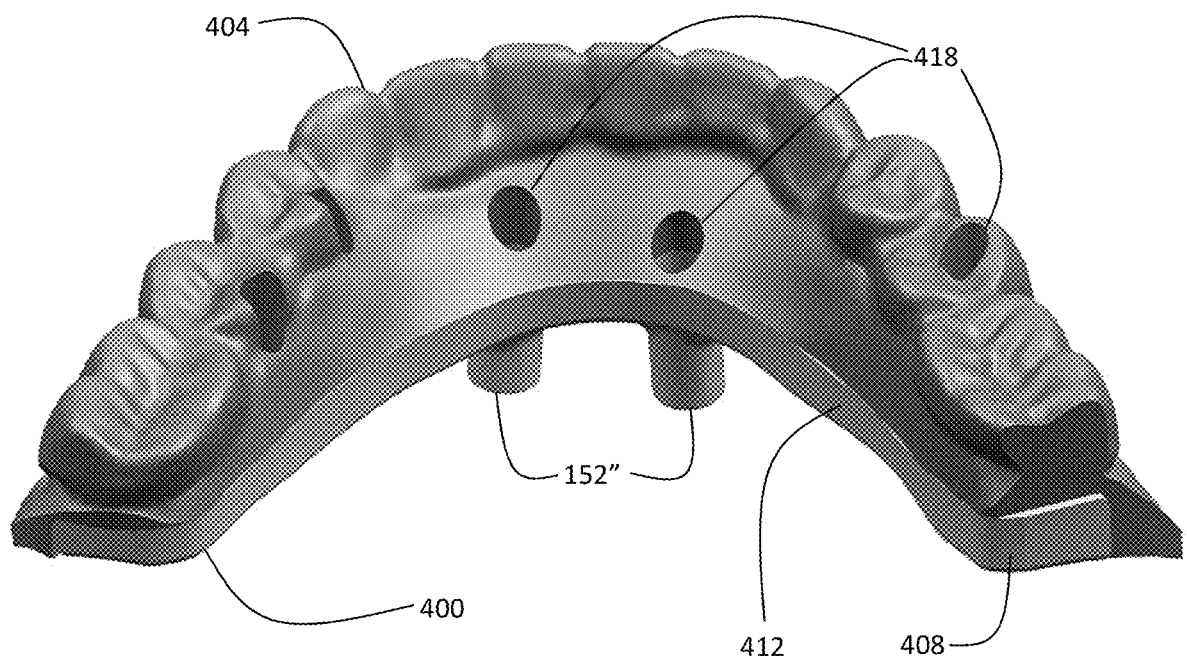
FIG. 15A is a back side view of the framework and the veneering overlay appropriately aligned and mating with one another.
Figure 15B:
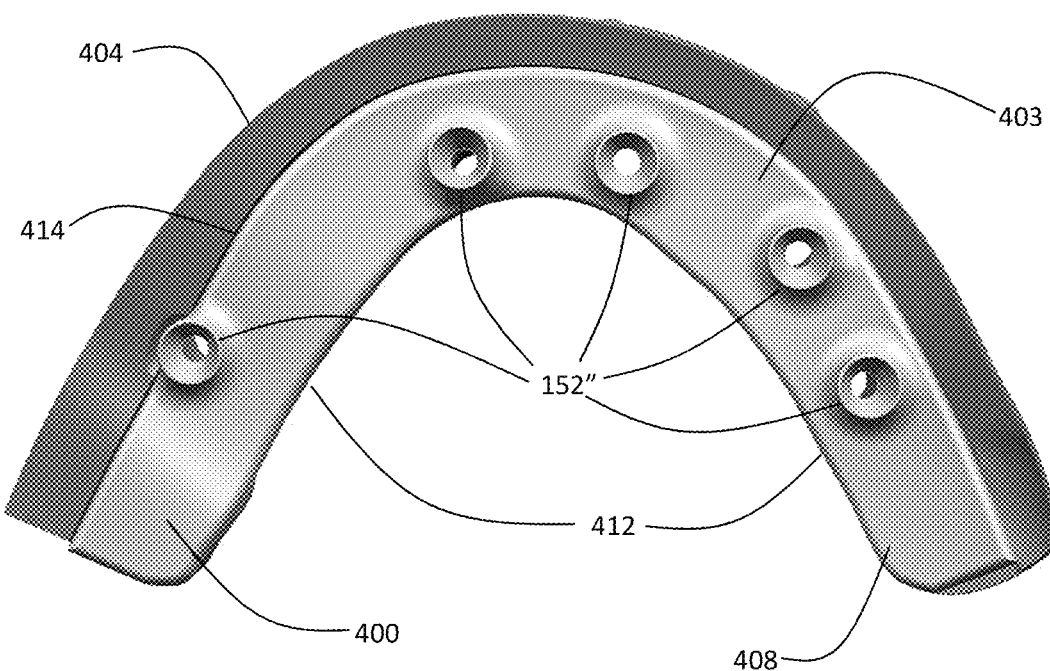
FIG. 15B is a bottom side view of the framework and the veneering overlay appropriately aligned and mating with one another.
Figure 15C:
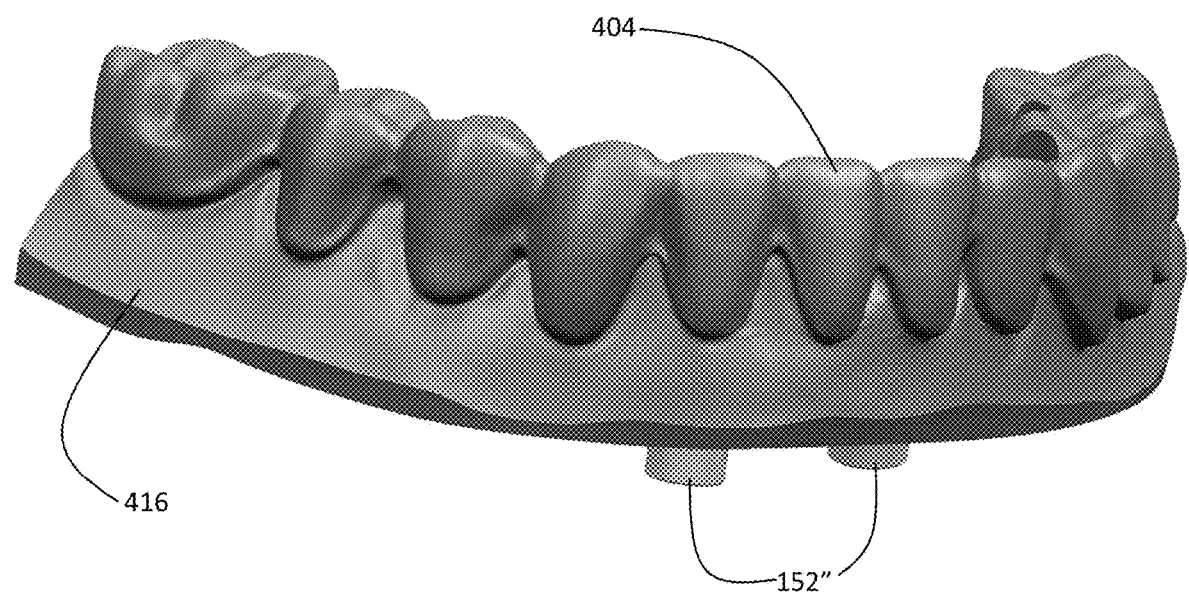
FIG. 15C is a perspective view of the framework and the veneering overlay appropriately aligned and mating with one another.
Figure 15D:
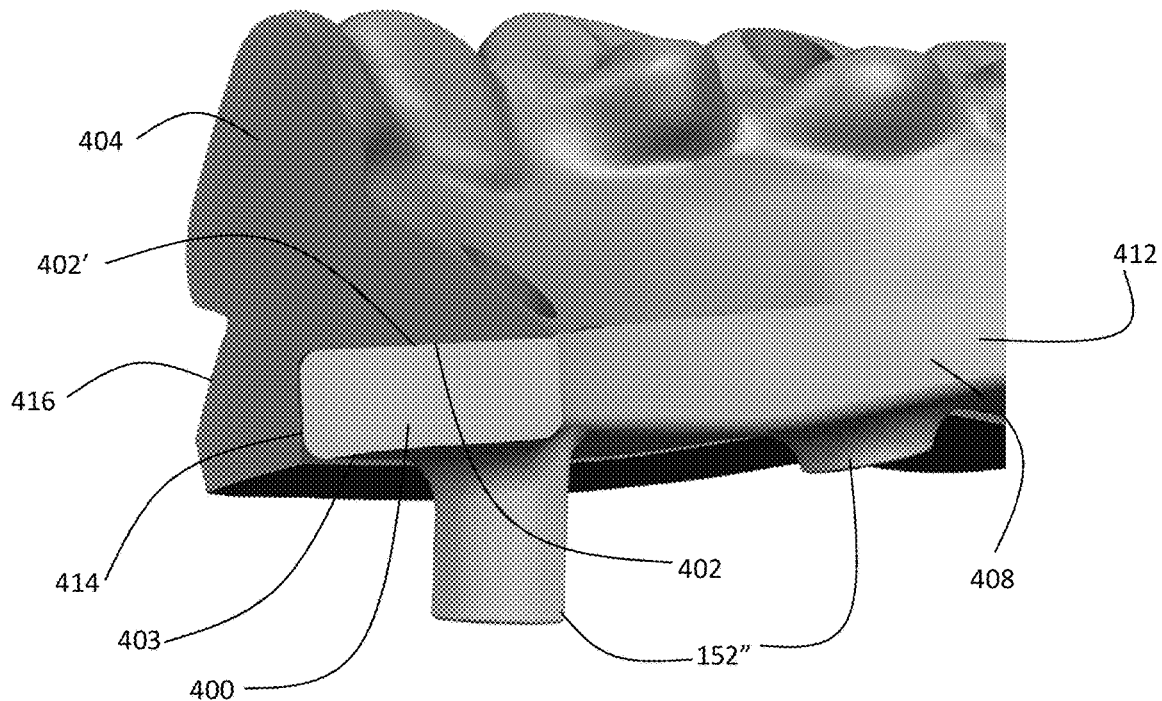
FIG. 15D is a cross-sectional view of the framework and the veneering overlay appropriately aligned and mating with one another.
Figure 15E:
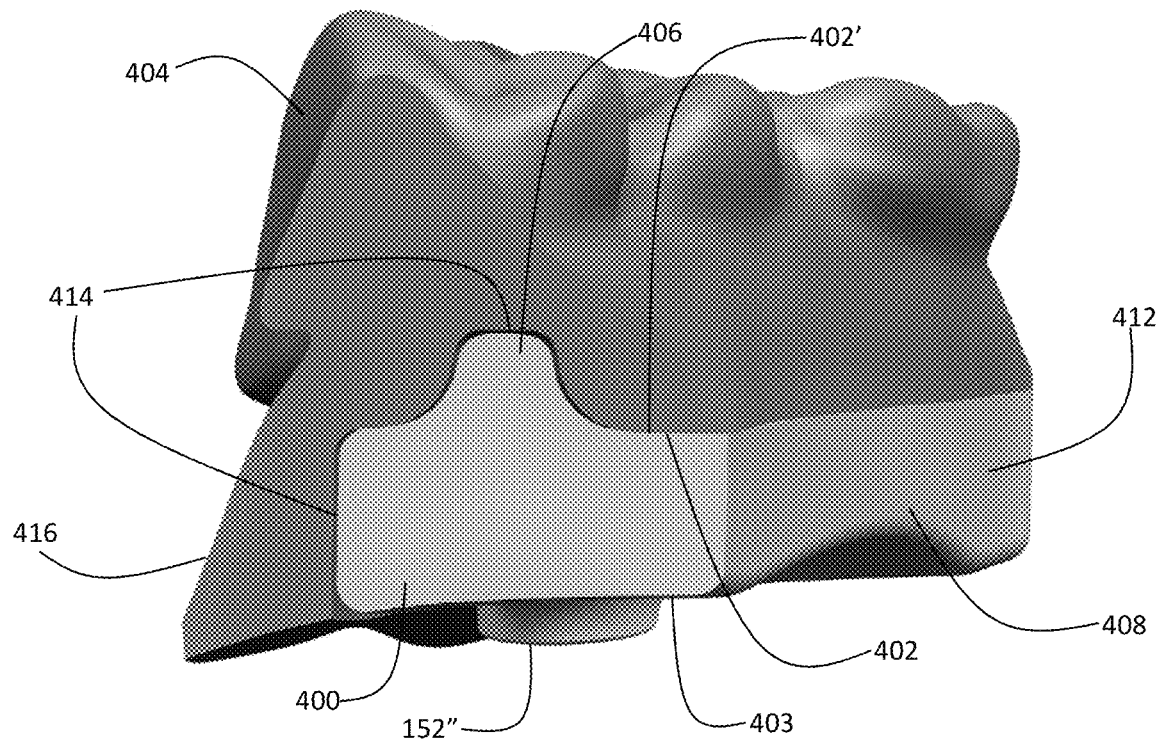
FIG. 15E is a second cross-sectional view of the framework and the veneering overlay appropriately aligned and mating with one another and demonstrating the cement gap pertaining to the protrusion on the top surface of the framework.

FIGS. 15A, B, C, D and E depict the preferred embodiment of the invention disclosed in application Ser. No. 15/068,423 and described above and demonstrate the framework bridging structure 400, veneering overlay 404, the mating surface 402', top surface 402, support posts 406, buccal wall 410, lingual wall 412 and clearance gap 414. FIGS. 15D and E are cross-sectional views of the framework 408 and veneering overlay 404 and demonstrate the areas where clearance gap 414 are positioned relative to the two parts. In the preferred embodiment depicted in these figures, the lingual wall of the framework is exposed. This feature is aimed at simplifying the operations associated with fabricating the framework and veneering overlay. The lingual wall 412 and the bottom surface 403 of the framework 408 may be polished and left exposed or the technician may choose to apply a dental material such as composite or acrylic to wrap and seal these surfaces. Some doctors prefer this type of design as it allows them to adjust or add to this surface as the patient's gingiva contours may change over time. This additional work can be done at the same time that any other required finishing steps are performed prior to delivering the restoration to the patient's mouth. The design of the veneering overlay 404 can also be altered by covering all or a portion of the lingual wall 412. The unique subtract body would need to be slightly altered to accommodate this design feature in creating the appropriate clearance between the lingual wall 412 and veneering overlay 404. As previously discussed, extending the veneering overlay 404 to cover a portion or all of lingual wall 412 can aid with the resistance to lateral forces and serve as a macro retention feature.

Figure 16A:
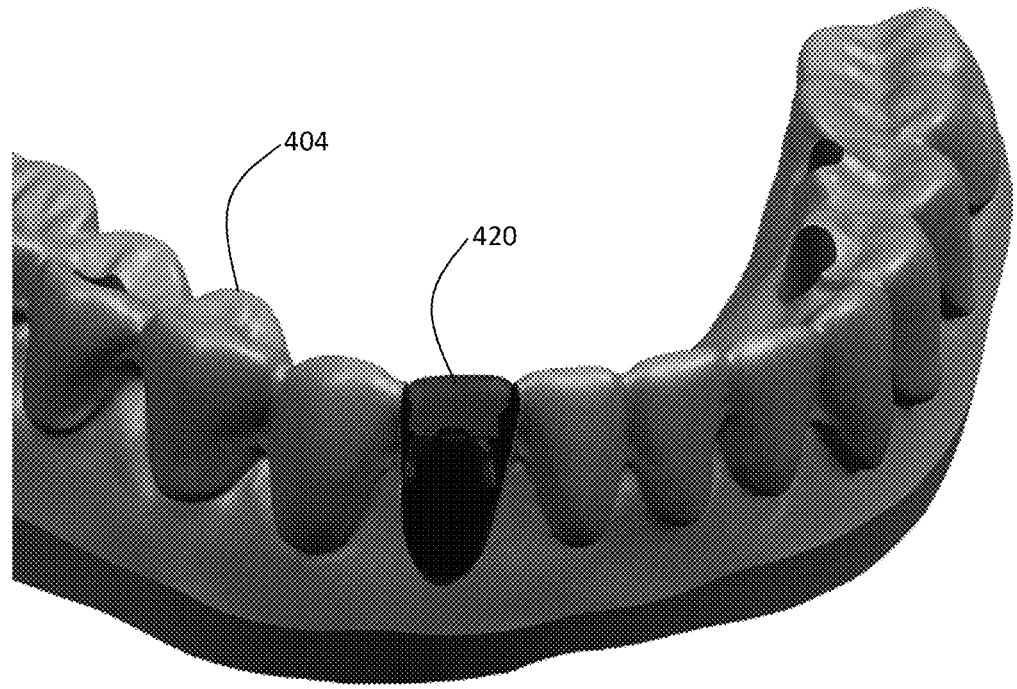
FIG. 16A is a perspective view of the framework, the veneering overlay, and crown appropriately aligned and mating with one another.
Figure 16B:
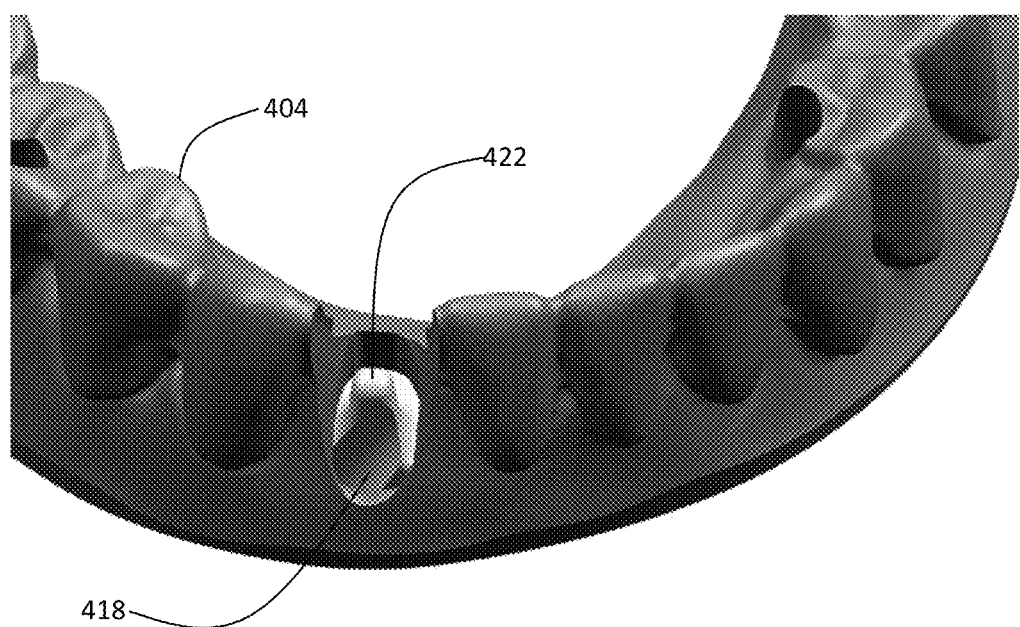
FIG. 16B is a perspective view of the framework and the veneering overlay appropriately aligned and mating with one another and with the PTF of the framework extending through the veneering overlay.
Figure 16C:
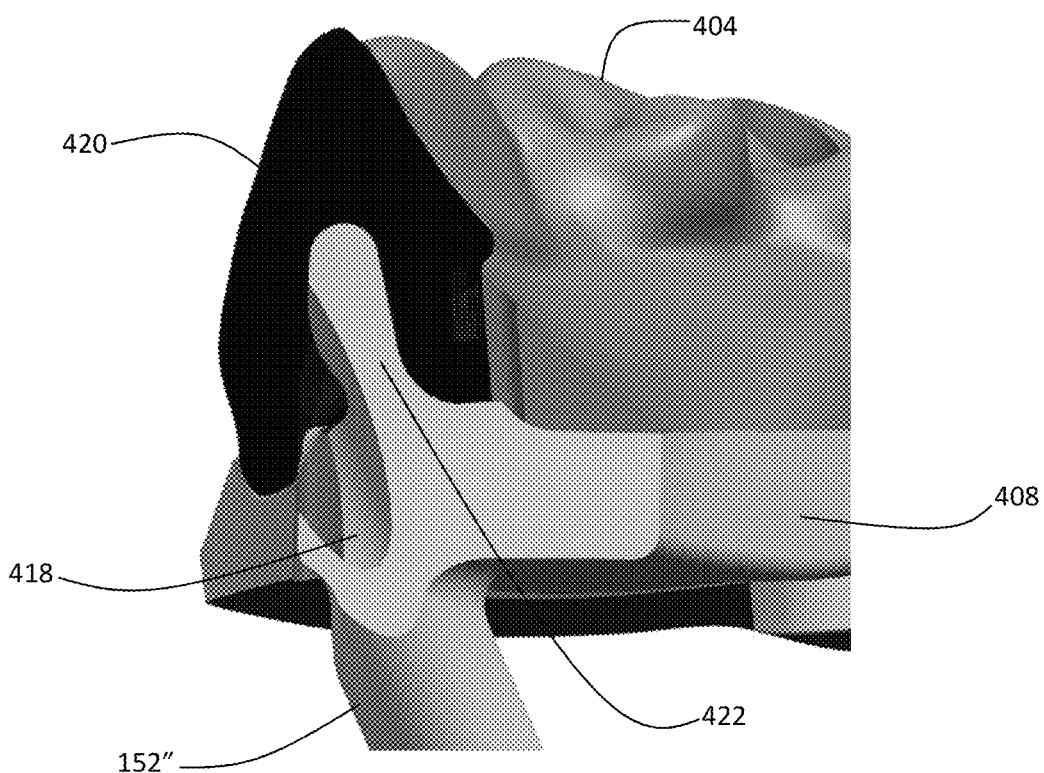
FIG. 16C is a cross-sectional view of the framework, the veneering overlay, and crown appropriately aligned and mating with one another, with the crown mating to the PTF associated with the framework.
Figure 16D:
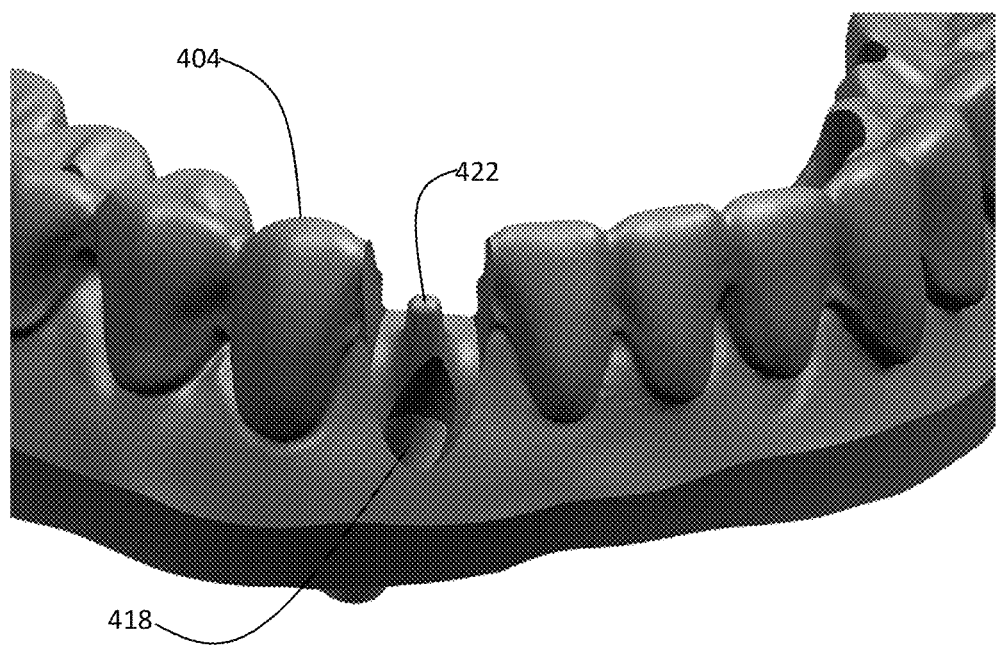
FIG. 16D is a perspective view of the framework and the veneering overlay appropriately aligned and mating with one another and with the PTF as part of the veneering overlay.
Figure 16E:
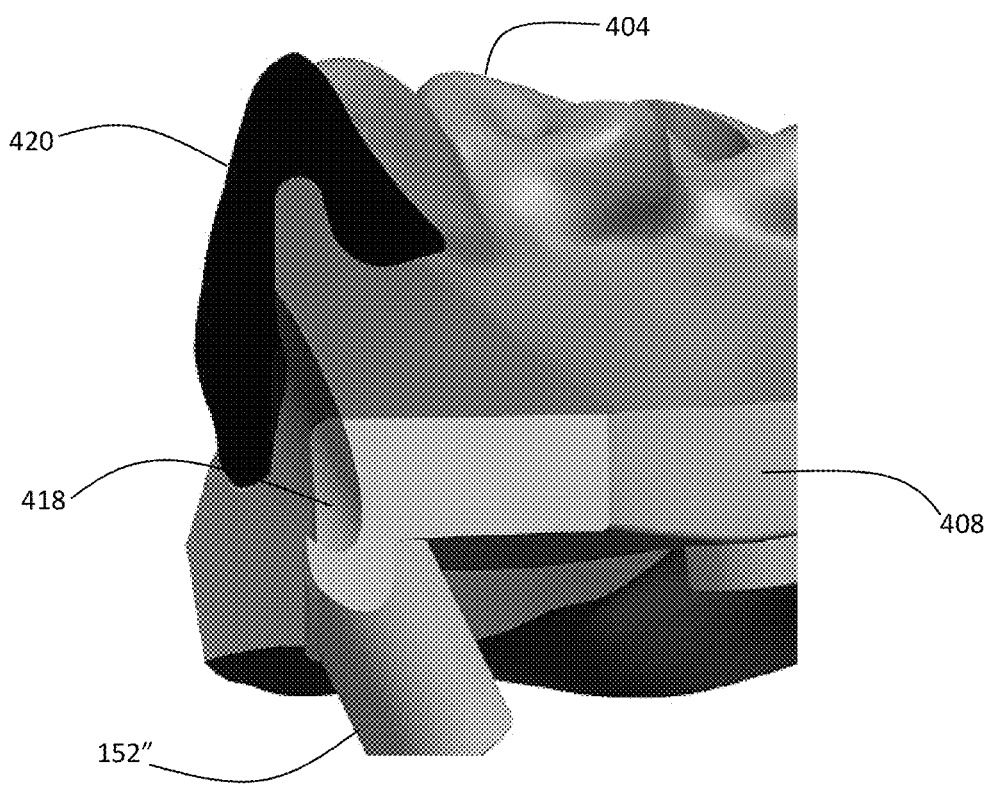
FIG. 16E is a cross-sectional view of the framework, the veneering overlay, and crown appropriately aligned and mating with one another, with the crown mating to the PTF associated with the veneering overlay.

In addition to cementing the veneering overlay 404 in the patient's mouth to avoid the poor aesthetics, a "prep tooth form" or "PTF" can be designed into the framework bridging structure or into the veneering overlay to support a single crown, veneer or bridge to cover the screw access hole. FIGS. 16A, B, and C depict a crown 420 being placed onto a PTF 422 that is part of the framework bridge structure 400. In FIGS. 16D and E demonstrates a crown being supported by a PTF 422 that is part of the veneering overlay 404. One benefit in designing PTF 422 as part of veneering overlay 404 is crown 420 and veneering overlay 404 can be fabricated from similar materials, such as Zirconia and allow for an improved shade match. In a similar fashion as discussed in patent application Ser. No. 14/272,566, the crown/PTF Assembly can be aligned relative to the contours of the diagnostic wax-up surface model 322. Once properly positioned, the PTF 422 and spacing/cement gap for the crown, veneer, or bridge in the veneering overlay 404 can be created by using Boolean Unite, Subtract, and Trim Operations in the CAD software. This process does not have to be limited to just areas where there is an issue with the screw access hole. This operation or design can be conducted throughout the entire prosthesis and allow for the utilization of different dental materials on the basis of the patient's clinical demands or doctor's preferences.

As previously mentioned, the veneering overlay 404 is created from the diagnostic wax-up surface model 322 which captured all of the surface characteristics of the teeth and gingiva contours of diagnostic wax-up 130. These contours can be left intact and the operator or technician can use a series of stains to color these contours to the appropriate shade per the material that the veneering overlay is fabricated from. However the veneering overlay 404 can be further refined to allow for additional laboratory processing such as the application of porcelain, composite, acrylics, or other dental materials to aid in the aesthetics of the final prosthesis. Additional Boolean or offset operations can be performed to the surface contours of the teeth or gingiva in the veneering overlay 404 to create a cutback 416 allowing for the appropriate support structure and space for these materials to be applied post fabrication. This process allows the laboratory technician to have a higher level of control on the look, shade and aesthetics of the final prosthesis. This process can also be performed on the tooth aspect of the overlay, again allowing for the technician to apply porcelains, composites, acrylics, or other dental materials to aid or improve the aesthetics of the final prosthesis. FIGS. 15A-E and 16A-E demonstrate a cutback for the gingiva only. It is obvious to one trained in the art, that a similar cutback could be performed to the tooth portions of the veneering overlay 404.

Once the surface models for both the Framework 408 and veneering overlay 404 have been finalized as noted in Step 832 the appropriate tool paths can be generated (Step 834) for the simultaneous manufacturing (Step 836) of both items. For fabrication purposes, one can choose from a number of different methodologies such as, but not limited to, milling, laser sintering, 3D printing, ceramic pressing, EDM, etc. . . . . The framework and veneering overlay can also be manufactured from a number of dental materials such as, but not limited to, titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . . Once the framework 408 and veneering overlay 404 have been manufactured, the operator can perform any of the necessary finishing activities and attach the veneering overlay to the framework by means of a bonding agent or other means of retention. In addition, the veneering overlay 404 may be manufactured directly to framework 408. In one example the Veneering Overlay can be printed directly onto the framework in the appropriately selected materials. A second example would be first milling the Veneering overlay in a wax material and then through the use of a lost wax technique, the veneering overlay portion can be cast directly to the framework. Obviously, these processes would involve additional work to refine the aesthetics before delivering to the patient's mouth.

In the first alternate embodiment of the invented process, the use of a virtual set up in place of the diagnostic wax-up 130. There are currently multiple dental systems and software (such as 3Shape, Dental Wings, Avadent, Ivoclar and Procera) which have the ability to lay in CAD models of denture teeth or stock teeth relative to scans of a stone cast and an opposing dentition. For this first alternate process, the stone cast and opposing cast would be scanned separately and then scanned in their proper orientation relative to one another. Utilizing the scan capturing the orientation of the stone cast and opposing cast, the scan data of the stone cast and opposing cast will be properly aligned to one another. Once properly aligned, the CAD models of the denture teeth or stock teeth will be positioned or their surfaces adjusted relative to the occlusion of the opposing cast or anatomical markers found on the casts. The operator can also adjust the occlusion by tools provided in the software. Once these CAD models have been properly positioned, the gingiva contours of the prosthesis can be constructed digitally and provide a CAD model of the gingiva. This resulting model can be used in the same fashion as the diagnostic wax-up surface model 322 in the above described process and provide the tooth and gingiva contours for the veneering overlay 404. The software programs also have tools that would allow for the appropriate design or construction of a gingiva or tooth cutback design allowing for the application of acrylic, composites, porcelain or other dental material to improve the aesthetics of the case.

In the second alternate process, the scanning process for capturing the implant and abutment positions is altered by the use of an intra-oral scanner that would directly capture the implant and/or abutment locations in the patient's mouth along with the gingiva contours. The intra-oral scanner can also capture the contours of a diagnostic wax-up, existing prosthesis or interim prosthesis that has been placed in the patient's mouth or the position and orientation of the opposing arch during the scanning process. From this digital data, the dentist or technician can identify the appropriate location of the digitally parameterized fittings 152" and generate the stone cast surface model 320 and the diagnostic wax-up surface model 322. This data can also be used in creating the virtual set up as just previously mentioned. This process would alleviate the dentist or technician from being required to create an impression or stone cast.

In a third alternate process, the dentist or technician can utilize a CT scan or series of CT scans for the basis of determining the appropriate position of the digitally parameterized fittings 152". The dentist or technician can use the CT scan data for determining or planning the position of the implant locations and ultimately the position of the digitally parameterized fittings 152". The use of a radiographic stent demonstrating the ideal tooth position for the restoration can also be included in this process and provide the dentist and technician with an ability to create the diagnostic wax-up surface model 322 or virtual set up relative to the contours of the radiographic stent or create a virtual set up relative to the position of the opposing arch. The dentist or technician could also utilize a CT scan of the patient's previous existing dentition, which could be aligned utilizing anatomical markers, in order to create the diagnostic wax-up surface model 322.

These alternate embodiments only demonstrate some of the potential options in combining different digital data acquisition protocols into the invented process. As can be appreciated, these are only a handful of potential embodiments of the invented process, but should provide insight as to the adaptation of future technologies.

Figure 17:
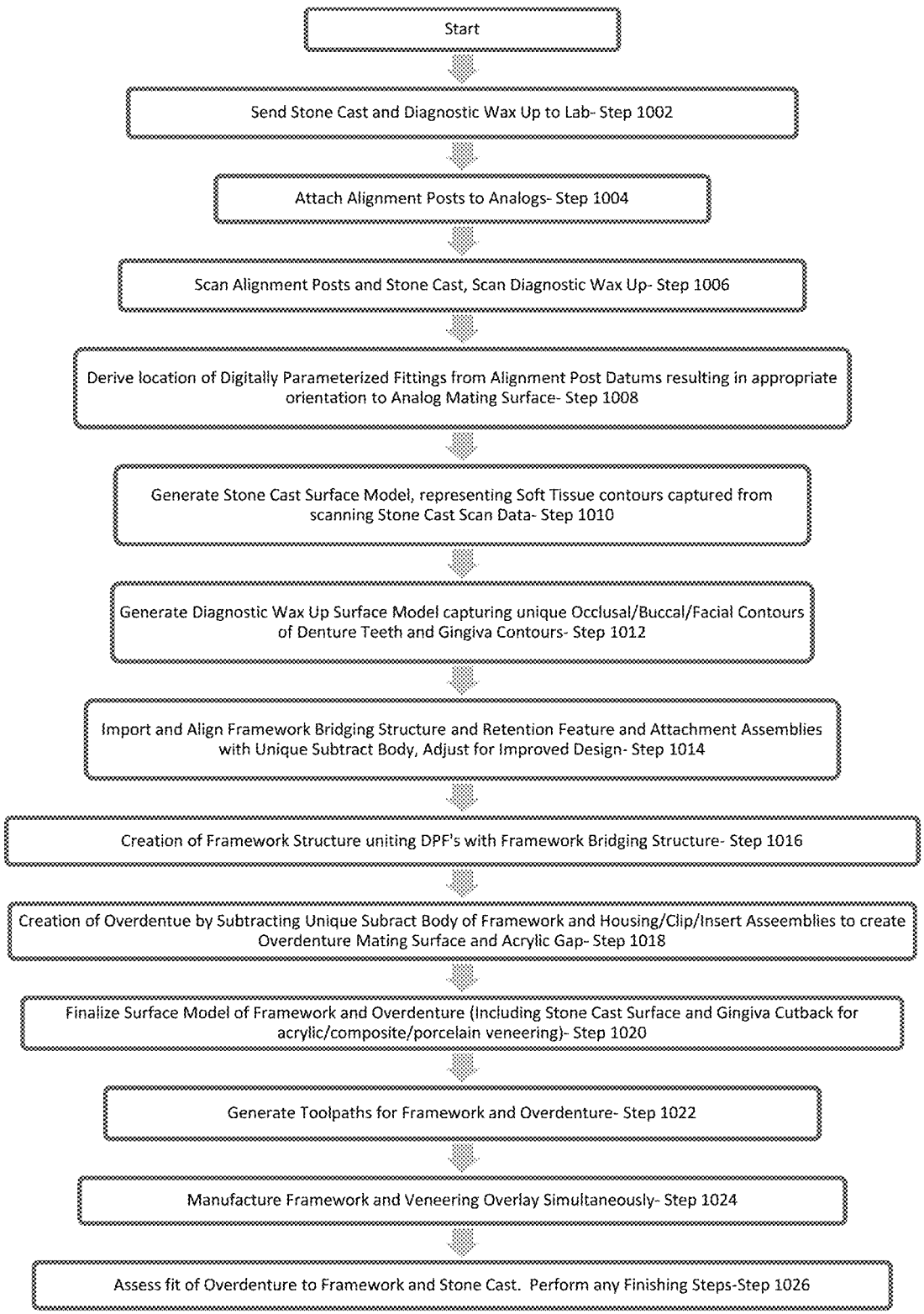
FIG. 17 is a flow chart demonstrating the steps for designing the invented prosthesis and framework.
Figure 19A:
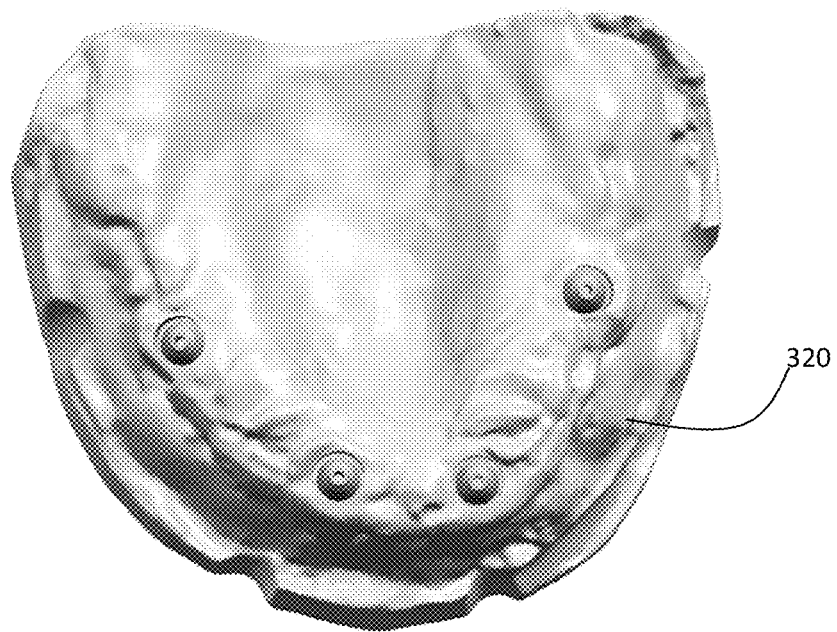
FIG. 19A is a top view of a stone cast surface model.
Figure 19B:
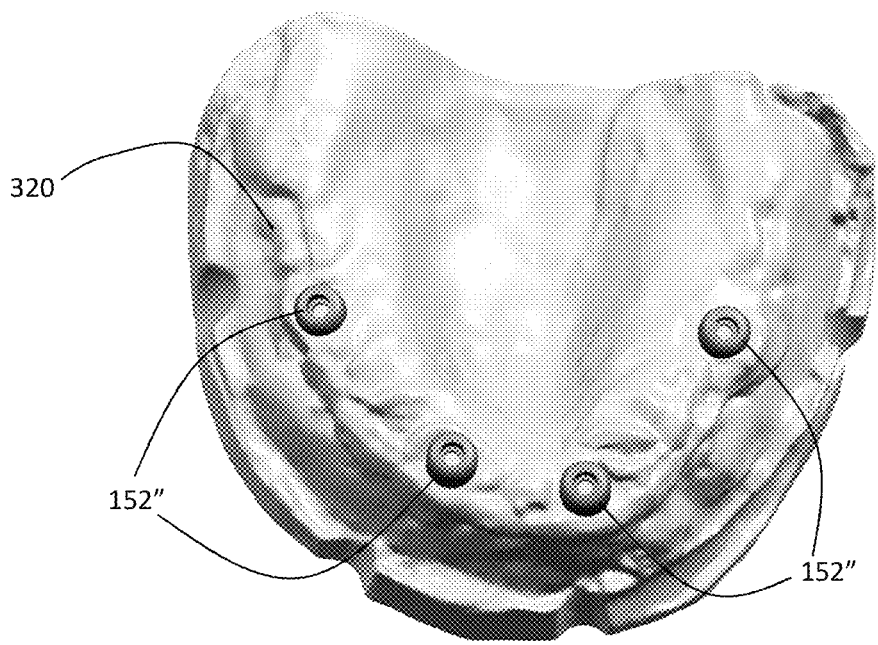
FIG. 19B is a top view of a stone cast surface model with digitally parameterized fittings properly aligned.

The above disclosed process from application Ser. No. 15/068,423 entails the steps and designs for a fixed restoration, one that only the dentist or a trained technician could remove from the patient's mouth. The enclosed invention utilizes a similar process along with a unique dental implant framework and overdenture design to provide a new removable prosthesis, one that can be removed and cleaned by the patient, and address the issues earlier noted for traditional overdenture designs. In FIG. 17, a flowchart is provided which outlines the necessary steps for designing and fabricating a new dental implant framework and overdenture design that provides improved strength and fit while maintaining an appropriate level of aesthetics for the case. The inventor discloses an invention consisting of a dental implant framework fabricated from a dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ) that supports an overdenture consisting of a second dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ). The overdenture will be retained onto the dental implant framework by means of one or more retention features and attachments such as housings, attachments, clips and inserts commonly used in dental market. FIG. 17 outlines the steps for designing and fabricating the preferred embodiment of the invention. Similar to the process disclosed in U.S. Pat. No. 8,100,692 and application Ser. No. 15/068,423, alignment posts 156 are attached to the analogs 124 of stone cast 125 and scanned where computer 186 determines the location and orientation of the alignment posts and sequentially selects and aligns digital parameterized fitting 152" based upon datums derived from the alignment posts 156. It may also be possible to scan and capture the orientation of the analogs directly and not use the alignment posts 156. The diagnostic wax-up 130 is also scanned either properly positioned on stone cast 125 or separately and then aligned to stone cast 125 utilizing the surface contour of the diagnostic wax-up 130 that abut the stone cast as they are a mirror image of surface contours of the stone cast 125. When the diagnostic wax-up is scanned it is critical to capture the denture teeth contours and gingiva contours as these contours will be replicated in the overdenture. Please note the term gingiva contours defines both gingiva and mucosa tissue contours that the overdenture will be replacing or replicating in the patient's mouth. Also the operator can utilize an interim prosthesis or existing restoration in place of the diagnostic wax-up if available for capturing these contours. Surface models of the stone cast (320) and diagnostic wax-up (322) are generated on the basis of the scan data. These surface models are constructed in such a way as to allow for Boolean Unite, Subtract, and Trim Operations to be performed utilizing these models or other CAD bodies. The above listed processes are outlined in Steps 1002-1012 of FIG. 17. FIG. 19A depicts stone cast surface model 320. FIG. 19B depicts digitally parameterized fittings 152" properly imported and aligned to stone cast surface model 320.

Figure 18:
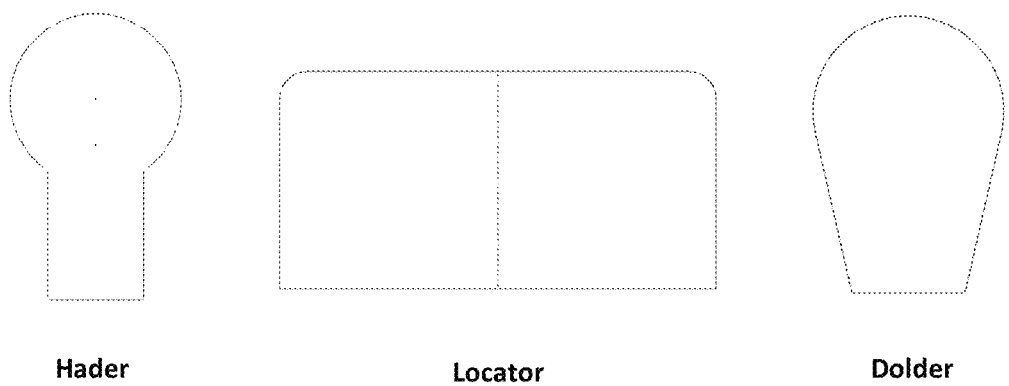
FIG. 18 is a picture demonstrating the different framework cross-sections commonly used for patient removable type restorations in the dental field.

Once all of the scan data, surface models (320 and 322) and digital parameterized fittings 152" have been aligned properly to one another, computer 186 imports and appropriately aligns framework bridging structure 900 relative to the digital parameterized fittings 152", stone cast surface model 320 and diagnostic wax-up surface model 322 as noted in STEP 1014. This step can also be performed manually by the operator. The framework bridging structure 900 consists of a predefined cross-section and possesses parametric attributes allowing for portion of the framework bridging structure to be adaptable to the unique contours of the diagnostic wax-up and stone cast surface models. The framework bridging structure can consist of a commonly used cross-section typically used in the dental field (i.e. Hader, Dolder, Locator, etc.). Some of these framework bridging structures incorporate the retention feature into the design of the dental implant framework, such as the Hader bar, whereas other framework bridging structure designs (i.e. Locator) have areas where prefabricated retention features are attached to the dental implant framework after it has been fabricated by means of a threaded hole, mechanical fit, friction fit, weld, cement, adhesive, composite or acrylic. The framework bridging structure can also consists of a predefined cross-section as determined by the end user or operator (i.e. a cylinder, circle, ellipse, square, polygon or other geometric shape). Images of the cross-section for the Hader, Dolder and Locator cross-sections have been included in FIG. 18. For the purposes of this application, the framework bridging structure will consist of a Locator bar geometry which is a rectangular cross-section and can vary in height and length depending upon the contours of the surface models 320 and 322. In some areas the bar may be taller than others due to the changes in the patient's soft tissue that are captured in the stone cast surface model 320. The operator can also choose to make the bar wider in some areas due to the varying contours of the diagnostic wax-up surface model 322 or to create improved strength characteristics for the dental implant framework. Ideally the top surface of the framework bridging structure will remain on a single plane, but this top surface can be offset in certain areas due to fluctuations of the vertical dimension in the patient's mouth. This top surface 902 will support and engage the resulting overdenture 904. The position and angulation of this top surface 902 can be adjusted automatically by computer 186 or by the operator to meet either the clinical demands for the dentist and technician or for ease in manufacturing. The angulation of top surface 902 will match the path of insertion for the overdenture. For other framework bridging structure designs, the top surface may not match the path of insertion. The position of this top surface 902 can be positioned substantially into the area where the denture teeth reside in the diagnostic wax-up 130. This design feature is possible as the overdenture 904 will be fabricated from a single monolithic piece, which will include the contours of the denture teeth scanned in diagnostic wax-up 130 and duplicated in diagnostic wax-up surface model 322. The buccal wall 910 of framework bridging structure 900 will be positioned ideally 1-4 mm from the buccal aspect of the diagnostic wax-up surface model 322. This required positioning allows for an appropriate amount of material to prevent any potential show through of the dental implant framework through the overdenture 904. The operator or computer will also adjust the bottom surface 903 of the framework bridging structure to have the appropriate clearance or contact with the gingiva contours as captured in the stone cast surface model 320. The stone cast surface model 320 can also be used as a Boolean CAD Tool to contour the bottom of the bar to match gingiva contours in the patient's mouth by means of a Boolean Subtract operation. For the Locator cross-section, the buccal wall 910 and lingual wall 912 are typically flat and held at a 90 degree angle relative to the top surface 902. In some instances the dentist or technician may choose to taper these walls relative to the top surface 902. Obviously, this wall angle could be adjusted to meet any technical demands of the dentist or technician or due to a limitation associated with the case. The buccal wall 910 and lingual wall 912 will normally be held within a fixed distance from one another (2 mm or more). In the preferred embodiment, the lingual wall 912 of the framework bridging structure 900 will be adjusted to terminate 0.5-4 mm from the lingual boundary of the diagnostic wax-up surface model 322. This distance ensures the lingual wall 912 of the framework bridging structure will be fully covered by the lingual boundary of the resulting overdenture 904. In this embodiment, the digital parameterized fittings 152" are substantially within the body of the framework bridging structure 900. In some embodiments these digital parameterized fittings 152" may extend through or slightly out of the framework bridging structure 900.

Figure 19C:
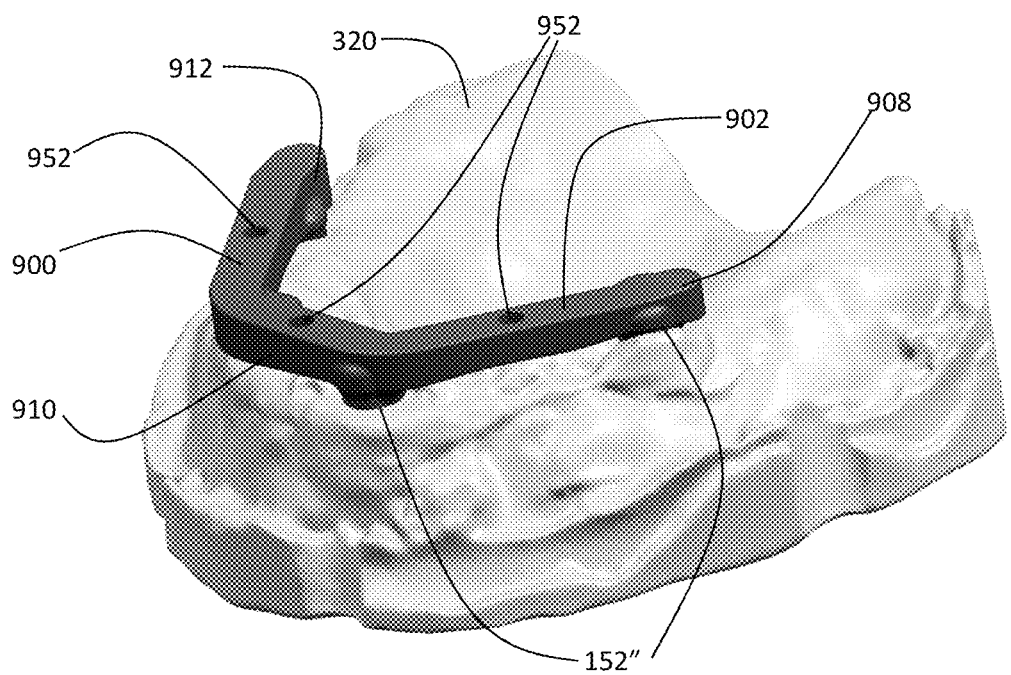
FIG. 19C is a perspective view of the framework bridging structures properly aligned to the stone cast surface model and digitally parameterized fittings.
Figure 19D:
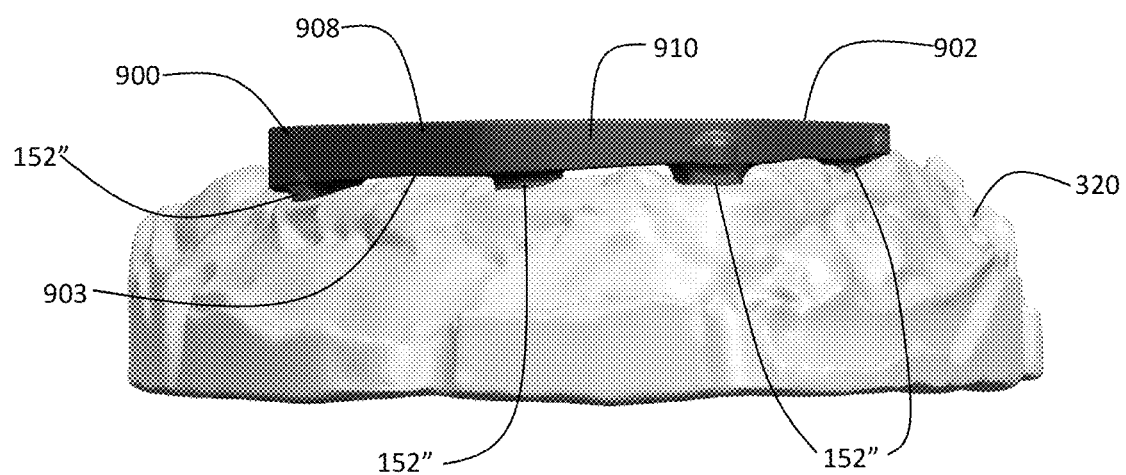
FIG. 19D is a front view of the framework bridging structures properly aligned to the stone cast surface model and digitally parameterized fittings.
Figure 19E:
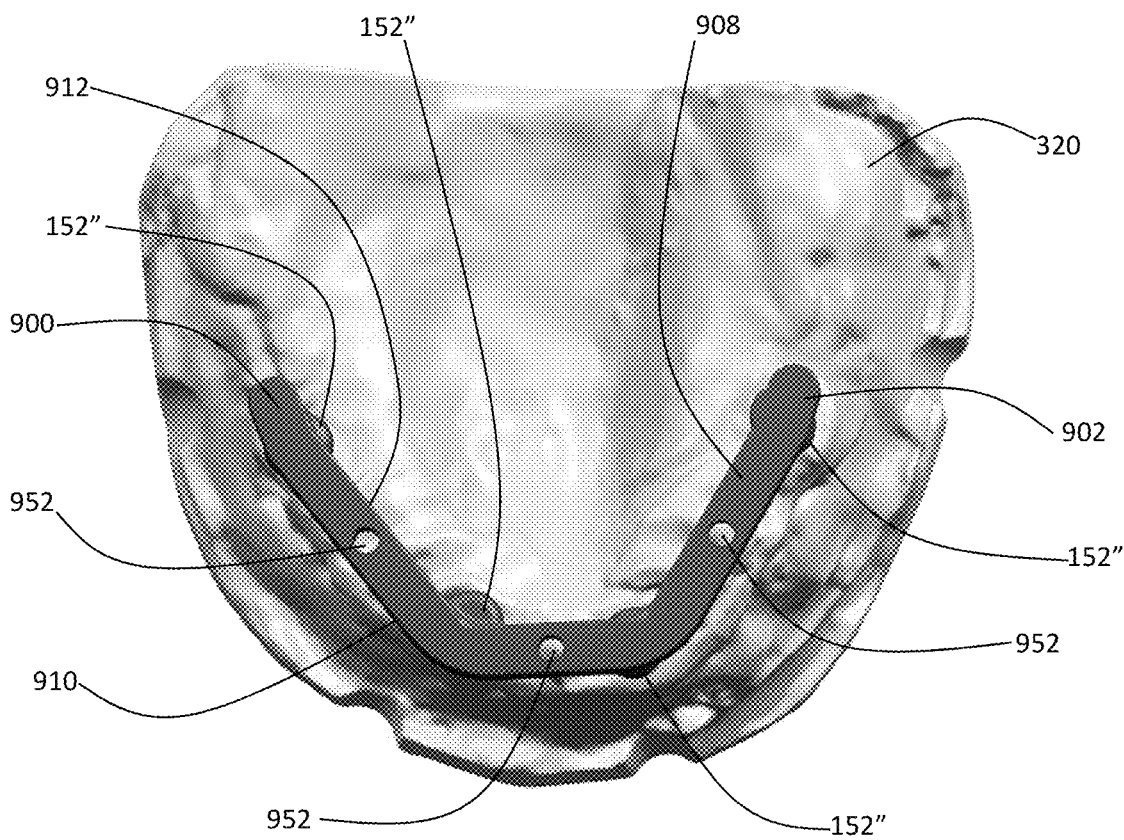
FIG. 19E is a top view of the framework bridging structures properly aligned to the stone cast surface model and digitally parameterized fittings.
Figure 20:
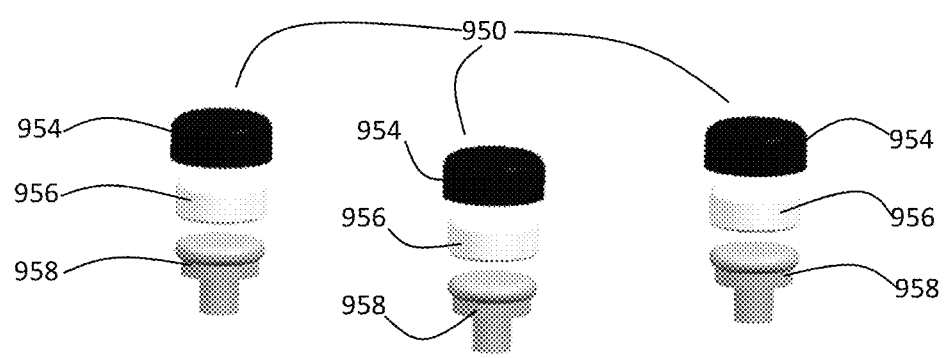
FIG. 20 is an exploded view of three Locator CAD Assemblies.
Figure 21:
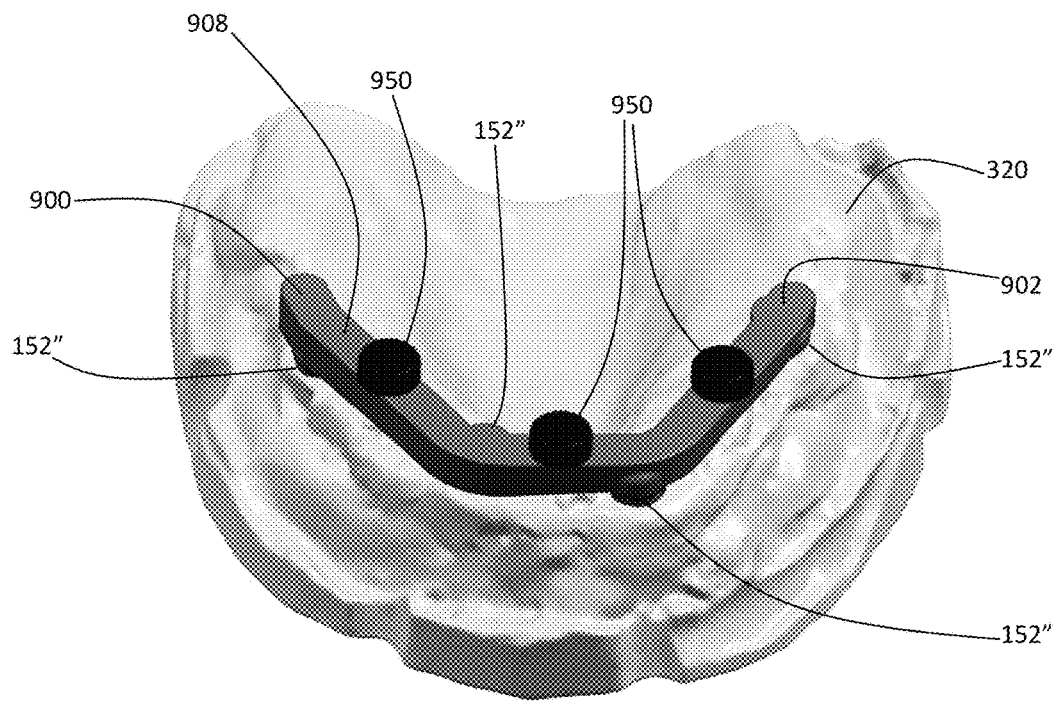
FIG. 21 is a top view of the framework bridging structures with Locator CAD assemblies properly aligned to the stone cast surface model and digitally parameterized fittings.

Once framework bridging structure 900 has been properly positioned relative to digitally parameterized fittings 152", stone cast surface model 320 and diagnostic wax-up surface model 322, CAD models of the appropriate retention features and attachments (i.e. housings, clips and inserts) will be aligned to framework bridging structure 900. The CAD models of the appropriate retention features and attachments can be imported individually or be a body within an assembly of the framework bridging structure. The CAD models can also consist of an assembly of the retention feature and attachment or just the unique individual bodies for each. The system can also be configured to utilize a simplified CAD body that may represent the largest portion of the assembly and reduce the file size or number of bodies required to complete the design of dental implant framework 908 and overdenture 904. For the Locator design being depicted in this application, Locator CAD assembly 950 will be aligned in the appropriate position on framework bridging structure 900. Locator CAD assembly 950 consists of predefined geometries that matches the readily available Zest parts (housing, insert and locator bar female) that will be fixated onto the dental implant framework by means of a threaded hole after fabrication and retain the overdenture to the dental implant framework in a removable fashion. The Locator CAD assembly will also include a CAD body to create threaded hole 952 to the design of framework bridging structure 900. Threaded hole 952 will be where the locator bar female will be threaded into the fabricated dental implant framework. The Locator CAD assembly will also include CAD bodies of the metal housing 954, insert 956 and locator bar female 958. FIG. 20 depicts an exploded view of the three Locator CAD Assemblies used for the design of dental implant framework 908 and overdenture 904. The Locator parts allow for the patient to remove and retain the overdenture 904 to dental implant framework 908. Obviously, CAD bodies for any of the commonly used or any new overdenture retention systems could be created, and design of the dental implant framework and overdenture in the same fashion as any of the commonly used or any new dental implant framework profiles can be used for the framework bridging structure design. FIG. 19C-E depict an embodiment of the dental implant framework 908 utilizing the Locator cross-section. As demonstrated by these figures, digital parameterized fittings 152" have been united through a Boolean Unite Operation to framework bridging structure 900, as noted in Step 1020 to create dental implant framework 908. Also, threaded holes 952 have been included in the final design of dental implant framework 908. Upon completion of fabrication of the dental implant framework 908, the prefabricated Locator parts will be attached to the framework by means of the threaded hole. FIG. 21 depicts the complete embodiment of dental implant framework 908 positioned relative to stone cast surface model 320 with Locator CAD assemblies 950 properly positioned.

Please note that for other dental implant framework profiles such as Hader Bar, the bridging structure will already possess the retention feature. In this instance, just the CAD assembly of the attachment will be aligned in the appropriate orientation relative to the retention features of the dental implant framework design.

As dental implant framework 908 is being designed and Locator CAD assemblies 950 are being properly positioned, overdenture 904 is being designed simultaneously. Overdenture 904 is created directly from diagnostic surface model 322, by the use of a Boolean subtract operation and a unique subtract body or bodies related to the dental implant framework 908. As discussed in application Ser. No. 15/068,423 where the unique mating surface of the veneering overlay 404 is updated/refined by a unique subtract body that is dependent upon the design features of framework bridging structure 400 and digital parametrized fittings 152", the overdenture 904 is updated and refined by a unique subtract body or bodies that are dependent upon the design features of framework bridging structures 900, digitally parameterized fittings 152" and retention features and attachments (in this instance the Locator CAD assemblies 950). The bridging structure, digitally, retention features and attachments can each include a unique subtract body as part of each CAD body. The subtract body can be a hidden feature or a visual representation such as a wire frame or translucent body where the operator can see the impact of the subtract body or bodies on the design, such as exiting through a buccal wall or affecting a design of a tooth portion of the restoration.

The subtract bodies can also be parametric and have a dependency related to the design of the bridging structures, retention features and attachments. The operator can choose to utilize the design of the subtract body to refine or alter the position, orientation, dimensions and features of the bridging structure, retention features or attachments. On example would be moving or shifting the positional orientation of the subtract body to refine the position of the retention feature and attachment relative to the bridging structure. Another example would be reducing the height or diameter of the subtract body which would alter the height and diameter of the retention feature and attachment. The CAD software can also combine the separate subtract bodies into one large CAD body or keep them as individual subtract bodies. The subtract bodies or body creates the necessary overdenture mating surface 902' and the appropriate clearance gaps 914 that provide the necessary space and clearance between buccal wall 910, lingual wall 912, parameterized fittings 152", and Locator CAD assemblies 950. Clearance around the buccal wall 910, lingual wall 912, Locator CAD assemblies 950 and digitally parameterized fittings 152" ensure for an intimate mating of the overdenture mating surface 902' to the top surface 902 of the framework bridging structure 900. This design aspect allows for an appropriate transfer of occlusal forces from the overdenture 904 to the top surface 902 of framework bridging structure 900 and ultimately to the dental implants in the patient's mouth. Overdenture mating surface 902' can also be configured to intimately mate with the Locator CAD assembly if preferred by the dentist. Clearance gap 914 also provides a path of insertion for the patient when placing overdenture 904 onto dental implant framework 908. This clearance gap 914 also provides a space where a bonding agent such as cement, acrylic, heat cured bonding agent, chairside material, or chemical bonding agent (epoxy) can be used to fixate the Locator attachment (housing and insert) into the overdenture, which will retain the overdenture to the framework by means of the retention feature (locator bar female).

Once the attachment(s) (housing and insert) have been fixated to the overdenture, the overdenture can be fixated in a removable fashion onto the framework when the insert mechanically engages the retention feature that has been fixated to the dental implant framework.

Figure 22A:
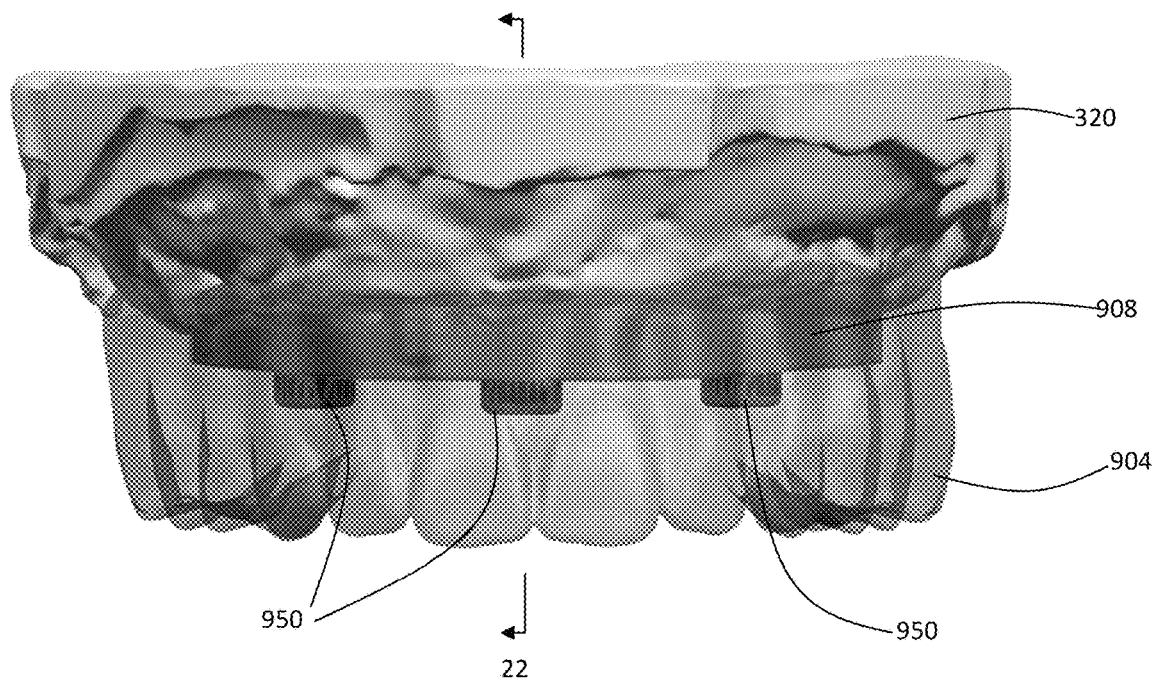
FIG. 22A is a front view of the overdenture properly aligned to framework, Locator CAD assemblies and stone cast surface model.
Figure 22B:
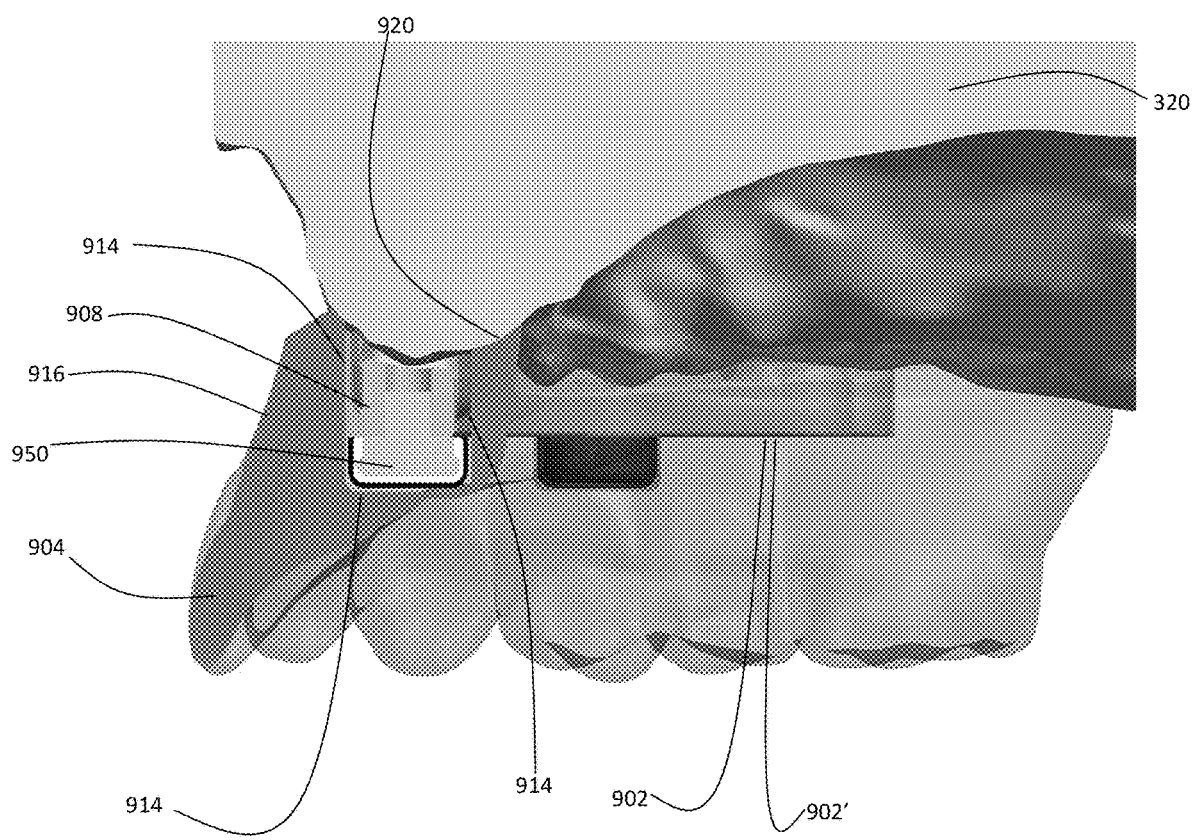
FIG. 22B is a cross-sectional view of the overdenture properly aligned to framework, Locator CAD assemblies and stone cast surface model.

It is obvious to the reader that the Locator parts described here in this application can be replaced with any number of currently used or newly designed overdenture retention features or attachments and bridging structure designs (i.e. Hader, Dolder, ERA, Equator, Ball, etc.). Also the overdenture retention features and attachments do not have to be positioned or placed solely on the top surface of the dental implant framework. Overdenture attachments can also include plungers, inserts or clips that have retentive means that engage retention features such as holes, recesses, balls or other mechanical features on the lingual or buccal wall of dental implant framework 908 (Swiss Lock, Breedent Balls, MK1 Attachments, etc.). One would only need to create the necessary CAD bodies for incorporating these additional overdenture attachments into the design process and appropriately refine the manufacturing process (mill, laser sintering, 3D printing, wire EDM, etc.). It is also obvious to the reader that the overdenture mating surface 902' can be designed to mate with a surface on the dental implant framework other than the top surface 902 as depicted in FIG. 22A-B. The overdenture mating surface 902', may be configured to mate with tapered side walls or the dental implant framework can consist of a rounded top as demonstrated with the Dolder cross-section in FIG. 18. The system can also be designed in such a way where the mating surface of the overdenture and dental implant framework do not require a retention feature or attachment but relies on a friction fit such as a Morse taper wall design between the overdenture and dental implant framework for the removable fixation of the two. In addition, overdenture mating surface 902' may be configured to mate only on the fittings 152". In the instance of the Hader cross-section, the overdenture does not mate directly onto the bridging structures. The overdenture 904 may only consist of appropriately sized clearance gap 914 as the clip that is fixated to overdenture 904 prevents the overdenture 904 from directly mating to dental implant framework 908. Obviously a combination of any the aforementioned or commonly available or future designs in the dental market would be acceptable.

Lastly, the stone cast surface model 320 is subtracted from overdenture 904 to create stone cast surface 920. This process creates the intimate contact of the overdenture against the soft tissue contours in the patient's mouth and prevents food and materials from entering underneath the overdenture and creating discomfort or unpleasant odors for the patient.

Overdenture 904 can also include a "prep tooth form" or "PTF" in the design to support a crown. One benefit in designing a PTF or series of PTF's as part of overdenture 904 is a crown or series of crowns can be fabricated from stronger materials, such as Zirconia or eMax and allow for an improved resistance to occlusal wear. In a similar fashion as discussed in patent application Ser. No. 14/272,566 the crown/PTF Assembly can be aligned relative to the contours of the diagnostic wax-up surface model 322. Once properly positioned, the PTF and spacing/cement gap for the crown, veneer, or bridge in the overdenture 904 can be created by using Boolean Unite, Subtract, and Trim Operations in the CAD software. Depending upon the operator's preference, the crowns can be united into a series of bridges or all of the crowns can be united into a single bridge. This operation or design can be conducted throughout the entire prosthesis and allow for the utilization of different dental materials on the basis of the patient's clinical demands or doctor's preferences. Also in a similar fashion, traditional denture teeth can be incorporated into the design of the overdenture. CAD models of the denture teeth can be aligned and appropriately scaled and subtracted by means of a Boolean operation from the diagnostic wax-up surface model 322. The Boolean subtraction will leave an appropriate void, where the denture teeth can be adhered after the overdenture has been milled. It should be noted that this process may be limited by the restorative space associated with the case.

As previously mentioned, the overdenture 904 is created from the diagnostic wax-up surface model 322 which captured all of the surface characteristics of the teeth and gingiva contours of diagnostic wax-up 130. These contours can be left intact and the operator or technician can use a series of stains to color these contours to the appropriate shade per the material that the overdenture is fabricated from. However, the overdenture 904 can be further refined to allow for additional laboratory processing such as the application of porcelain, composite, acrylics, or other dental materials to aid in the aesthetics of the final prosthesis. Additional Boolean or offset operations can be performed to the surface contours of the teeth or gingiva in the overdenture 904 to create a cutback 916 allowing for the appropriate support structure and space for these materials to be applied post fabrication. This process allows the laboratory technician to have a higher level of control on the look, shade and aesthetics of the final prosthesis. This process can also be performed on the tooth aspect of the overdenture, again allowing for the technician to apply porcelains, composites, acrylics, or other dental materials to aid or improve the aesthetics of the final prosthesis. FIGS. 22A and B and 23A and B demonstrate a cutback for the gingiva only. It is obvious to one trained in the art, that a similar cutback could be performed to the tooth portions of the overdenture 904.

Figure 23A:
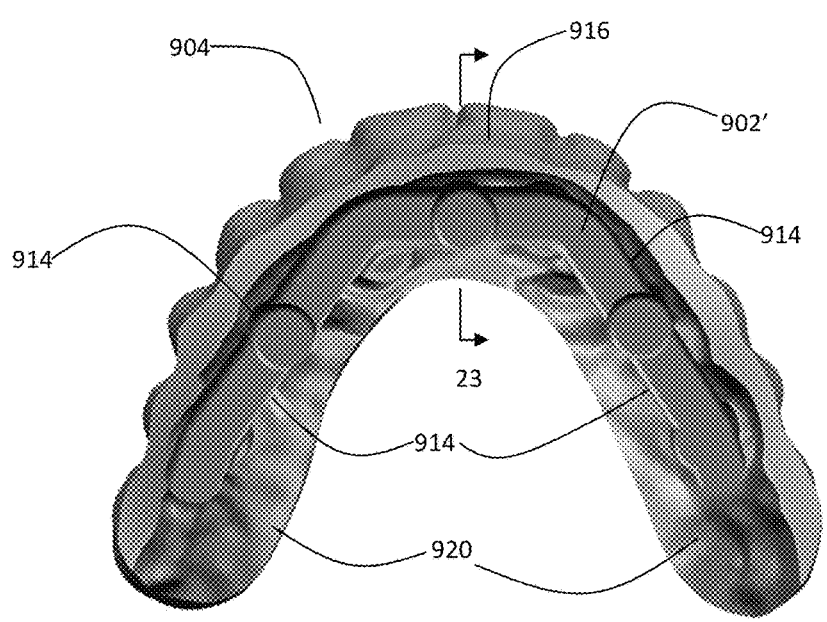
FIG. 23A is a bottom view of the overdenture demonstrating the overdenture mating surface and stone cast surface.
Figure 23B:
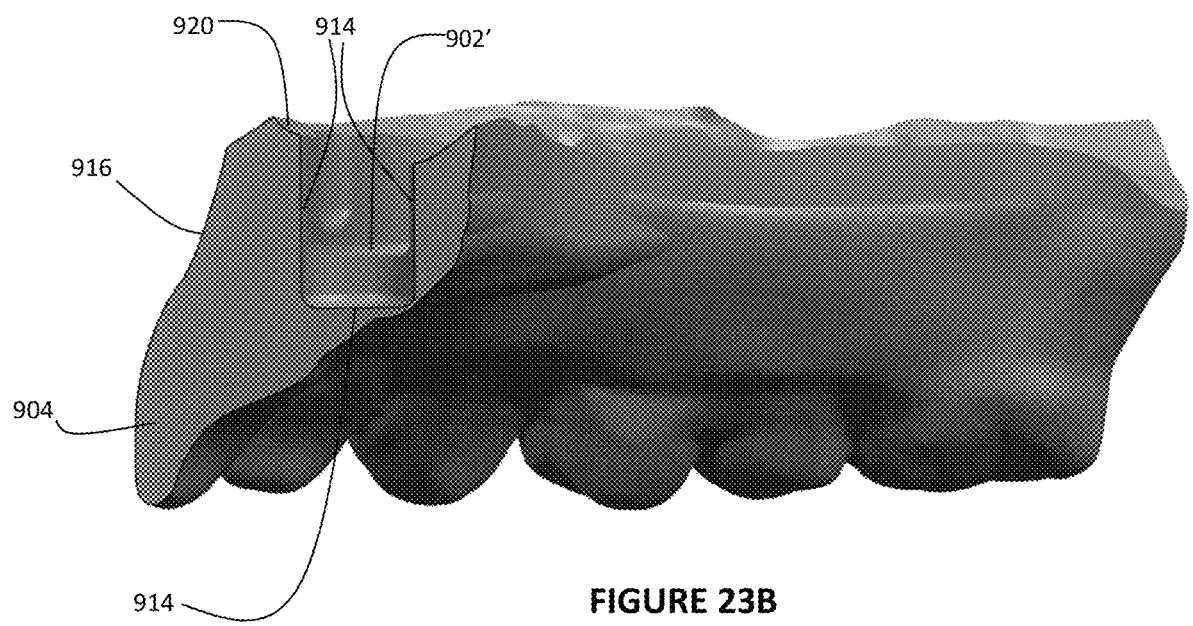
FIG. 23B is a cross-sectional view of the overdenture demonstrating the overdenture mating surface and stone cast surface.

FIG. 22A-B depicts a complete embodiment of the invention and described above and demonstrates the dental implant framework 908, overdenture 904, overdenture mating surface 902', top surface 902, Locator CAD assemblies 950, clearance gap 914, cutback 916 and stone cast surface 920. FIG. 22B is a cross-sectional view of the dental implant framework 908 and overdenture 904 and demonstrates the areas where clearance gap 914 is positioned relative to the two parts and the positioning of the Locator CAD Assembly. FIG. 23A-B depicts the overdenture portion of the invention and demonstrates the overdenture mating surface 902', clearance gap 914, cutback 916 and stone cast surface 920. FIG. 23B is a cross-sectional view of overdenture 904 and demonstrates the monolithic design of the teeth and mating surface 902'. This monolithic or single piece design creates the improved strength characteristics over the traditional acrylic processed designs previously discussed, where the weak bond in the prosthesis is between the denture teeth and the processed acrylic. The design also eliminates the requirements for an overcasting and creates an improved fit of the overdenture to the dental implant framework 908 and intimate contact with the patient's soft tissue. Also by eliminating the overcasting, potential future modification's or repairs are much easier. With a traditional overdenture and overcasting, special care would need to be taken to be able to modify these elements and prevent the requirement for a completely new restoration being fabricated. Incorporating cutback 916 for the gingiva or tooth portions of the overdenture, allows for the technicians to have continued control over the final esthetics of the case.

Once the surface models for both the dental implant framework 908 and overdenture 904 have been finalized as noted in Step 1020 the appropriate tool paths can be generated (Step 1022) for the simultaneous manufacturing (Step 1024) of both items. For fabrication purposes, one can choose from a number of different methodologies such as, but not limited to, milling, laser sintering, 3D printing, ceramic pressing, EDM, etc. . . . . . The dental implant framework and overdenture can also be manufactured from a number of dental materials such as, but not limited to, titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . . Once the dental implant framework 908 and overdenture 904 have been manufactured, the dentist or technician can perform any of the necessary finishing activities and review the fit of the overdenture to the dental implant framework. The dentist and/or technician can also proceed with fixating the overdenture attachments to the overdenture by means of a bonding agent such as cement, acrylic, heat-cured bonding agent, chairside material or chemical bonding agent (epoxy).

It can be appreciated by the reviewer that one of the unique processes for the invention is the simultaneous design of the overdenture and dental implant framework by means of the unique subtract bodies. It should be noted that this technology can be implemented and used for overdentures where the teeth and gingiva portions are being designed and manufactured separately. The unique CAD subtract body or plurality of unique subtract bodies will still be able to create and enhance the design and mating or clearance geometries for the teeth and gingiva portions and allow for improved efficiencies in the production process.

Grobbee et al. disclose in U.S. Pat. No. 9,055,993 a bar reference and registration system to place a bar in a CAD/CAM manufactured denture base. In the Background of the Invention, the inventor discloses the limitation associated with the CAD/CAM denture as it is made directly without using wax and plaster models, whereas the metal bar is designed and manufactured from the plaster model. He further explains the complexity of the bar makes it difficult to precisely and securely fit in the denture and small discrepancies will occur if the full shape of the bar is used for reference. Grobbee introduces the use of an oversized cavity and the use of reference posts (preferably 3) to create registration by the interfacing of the reference posts with corresponding cavities in the denture base. The reference posts will hold the bar in a fully constrained and a unique position to where the denture can be further processed where an additional material can be added making the support bar and denture fixed or remain in a removable fashion with the use of snap-fit portions. The reference posts are added after the production of the support bar. Also the CAD/CAM denture has an oversized cutout to minimize and limit the contact between the profile of the bar and the cutout as it may create the discrepancies in the fit and orientation of the support bar and CAD/CAM denture. The major limitation of this technology is that the support bar and denture are not being designed concurrently and are reliant upon the reference posts that are added to the support bar. Grobbee never discloses as to how the relationship or fixed reference is established between the support bar and CAD/CAM denture. Is the process performed digitally? Are there manual operations involved (attaching reference posts and scanning)? How is the reference established since the plaster model (per Grobbee an unwanted expense) is never incorporated in the process for the CAD/CAM denture? Also, the application never discusses or discloses any other way in which a similar frame of reference is established between the support bar and CAD/CAM denture.

One can only assume this information was not disclosed as part of trade secrets by the inventor. Also, one would assume the reference posts are quite unique, especially in the instance of a snap-fit configuration, because if they weren't how would they be different from that of a Locator Assembly or any number of other readily available overdenture connections found in the market (Locator, ERA, Equator, Ball, Swiss Lock, Breedent Balls, MK1 Attachments, etc.)?

In the disclosed detailed embodiment of this application, the invention of a unique subtract body and process of designing both the overdenture and dental implant framework simultaneously avoids the complexities and problems noted in U.S. Pat. No. 9,055,993 and allows for the operator to determine and choose the appropriate area or areas where the overdenture should mate with the dental implant framework, fittings, retention features or attachments. The author has already established the benefit of creating a mating surface between the overdenture and dental implant framework and improving the transfer of occlusal loads from the patient to the implants. The disclosed process in this application also does not require the addition of reference posts and enables the use of readily available retention features and attachments and bridging structure designs (i.e. Hader and Dolder) that have built-in retention features.

In the first alternate embodiment of the invented process, the use of a virtual set up in place of the diagnostic wax-up 130. There are currently multiple dental systems and software (such as 3Shape, Dental Wings, Avadent, Ivoclar and *Procera*) which have the ability to lay in CAD models of denture teeth, stock teeth, and gingiva relative to scans of a stone cast and an opposing dentition. For this first alternate process, the stone cast and opposing cast would be scanned separately and then scanned in their proper orientation relative to one another. Utilizing the scan capturing the orientation of the stone cast and opposing cast, the scan data of the stone cast and opposing cast will be properly aligned to one another. Once properly aligned, the Operator will position the CAD models of the denture teeth or stock teeth relative to the occlusion of the opposing cast or anatomical markers found on the casts. The operator can also adjust the occlusion by tools provided in the software. Once these CAD models have been properly positioned, the gingiva contours of the prosthesis can be constructed digitally or an appropriate cutback for the teeth or gingiva can be designed digitally. This resulting model can be used in the same fashion as the diagnostic wax-up surface model 322 in the above described process and provide the tooth and gingiva contours for the overdenture 904. The CAD models of the teeth and gingiva are parametric and easily modified digitally. The operator can also construct a dependency between the CAD models of the teeth and gingiva and the design features of the bridging structures, retention features, attachments and any of the unique CAD subtract body or plurality of unique subtract bodies. This process would allow for simultaneous updates in the design or orientation of any of these features on the basis of the operator moving the position of a tooth or refining a gingiva contour to provide the design that is appropriate to the patient and per the requirements of the doctor. The software programs also have tools that would allow for the appropriate design or construction of a gingiva or tooth cutback design allowing for the application of acrylic, composites, porcelain or other dental material to improve the aesthetics of the case. These cutback designs can be performed manually or it can be part of the assembly for the CAD models of the teeth and gingiva. The operator can utilize a shelling or offset tool to create the necessary cutback or have a secondary dependent body that is part of an assembly of the CAD models of the teeth and gingiva.

In the second alternate process, the scanning process for capturing the implant and abutment positions is altered by the use of an intra-oral scanner that would directly capture the implant and/or abutment locations in the patient's mouth along with the gingiva contours. The intra-oral scanner can also capture the contours of a diagnostic wax-up that has been placed in the patient's mouth or the position and orientation of the opposing arch during the scanning process. From this digital data, the dentist or technician can identify the appropriate location of the digitally parameterized fittings 152" and generate the stone cast surface model 320 and the diagnostic wax-up surface model 322. This process would alleviate the dentist or technician from being required to create an impression or stone cast. In addition to scanning the diagnostic wax-up, the dentist or technician can scan an interim prosthesis or existing restoration to capture these required contours. The dentist and technician can also use this data to create a virtual set up as just previously discussed.

In a third alternate process, the dentist or technician can utilize a CT scan or series of CT scans for the basis of determining the appropriate position of the digitally parameterized fittings 152". The dentist or technician can use the CT scan data for determining or planning the position of the implant locations and ultimately the position of the digitally parameterized fittings 152". The use of a radiographic stent demonstrating the ideal tooth position for the restoration can also be included in this process and provide the dentist and technician with an ability to create the diagnostic wax-up surface model 322 relative to the contours of the radiographic stent or create a virtual set up relative to the position of the opposing arch. The dentist or technician could also utilize a CT scan of the patient's previous existing dentition, which could be aligned utilizing anatomical markers, in order to create the diagnostic wax-up surface model 322.

In the first alternate embodiment of the invention, the overdenture is designed to mate with overdenture abutments versus the use of a dental implant framework. Similar to the above disclosed process, alignment posts 156 are attached to the analogs 124 of stone cast 125 and scanned where computer 186 determines the location and orientation of the alignment posts. Alignment posts 156 can be configured to attach to an implant level analog or to an overdenture abutment analog in the stone cast. It may also be possible to scan and capture the orientation of the implant level analogs or overdenture abutment analogs directly and not use the alignment posts 156. Instead of sequentially selecting and aligning digital parameterized fitting 152" based upon datums derived from the alignment posts 156, computer 186 can select and align CAD files of appropriately sized overdenture abutments that will mate with the anchors in the patient's mouth. The overdenture abutment includes one or more retention features similar to that demonstrated in the locator bar female previously discussed. The CAD files of the overdenture abutments can also include an assembly similar to the Locator CAD Assembly shown in FIG. 20 that will include the attachment, i.e. metal housing and insert. This assembly will also include a unique subtract body that will be dependent upon the design features of the overdenture abutment, retention features and attachments and will create an appropriate clearance gap into the overdenture 904 where the attachment (metal housing and insert) can be fixated. The subtract body of the CAD assembly can also create a mating surface for the retention feature and attachment, such as a mating of the top surface of a housing and provide a more accurate positioning of the attachment when being fixated. The overdenture abutment can also consist of a similar subtract body to create a mating surface in the overdenture as well as clearance gaps similar to that of the dental implant framework. Similar to the dental implant framework, the subtract bodies can also be parametric and have a dependency related to the design of the overdenture abutments, retention features and attachments. The operator can choose to utilize the design of the subtract body to refine or alter the position, orientation, dimensions and features of the overdenture abutment, retention features or attachments. As obvious to the reader this process could be implemented to any premanufactured and readily available overdenture abutment (such as Locator, ERA, Ball, R-Tx, Conus, Smileloc, etc.). This process could also incorporate a custom abutment design, where the operator is able to adjust the height, soft tissue emergence profile, angle or orientation of the overdenture abutments. In using the custom abutment design process, the operator can ensure all of the overdenture abutments share the same path of insertion for the overdenture and improve the seating of the overdenture by the patient or doctor. The operator can also utilize the custom abutment design to create mating surfaces on the top or side walls of the abutments. This design option would allow for the transfer of occlusal forces through the abutments and increase the life expectancy of the attachments (i.e. clips and inserts). In the instance of a top surface engagement, the overdenture abutment would consist of a flat top for the overdenture to mate to and would include a retention feature such as a ball or slot on the buccal or lingual wall, where the attachment that is fixated in the overdenture would be able to engage. In another configuration, the overdenture abutment could be designed with tapered walls just below the retention feature. The overdenture would be able to mate and engage these tapered walls and possess an appropriate clearance gap where an attachment (housing, clip, insert, etc.) can be fixated and aid in retaining the overdenture. The unique subtract body can also be configured to create clearance gaps in areas where you don't want the overdenture to engage the overdenture abutments, similar to the unique subtract body creating the necessary clearance gaps on the buccal and lingual walls of the dental implant framework. The system can also be designed in such a way where the mating surface of the overdenture and overdenture abutments do not require a retention feature or attachment but relies on a friction fit such as a Morse taper wall design between the overdenture and overdenture abutments for the removable fixation of the two. As obvious to the reviewer, many different configurations are possible similar to those discussed previously with the dental implant framework. The overdenture 904 will be designed and fabricated in a similar fashion as discussed above and from an appropriate dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ). The major difference in this embodiment of the overdenture versus the above described is the size and shape of the recess created by the subtract bodies. In the case of the custom overdenture abutments, the overdenture and overdenture abutments can be fabricated simultaneously. The overdenture abutments can be fabricated in a similar fashion and material as the dental implant framework and from an appropriate dental material (titanium, cobalt chrome, zirconia, wax, plastic, composites, acrylic, lithium disilicate, plastic, PMMA, high performance polymer, resin ceramic (Lava-Ultimate, Vita-Enamic) semi-precious metals, precious metals, ceramic, composite, acrylic, wax, etc. . . . ). It is also obvious that any of the aforementioned alternate processes can be utilized for the design and fabrication of this alternate embodiment, such as the use of intra oral scanning or surgical planning of implant locations for determining overdenture abutment positions and creating diagnostic surface models.

U.S. Pat. No. 9,801,701 discloses a method for designing a retention pocket with injection channel into the gingiva portion of a dental prosthesis. The retention pocket is intended for an attachment to be fixated to the gingiva portion of the prosthesis and where the injection channel is used to introduce a curable adhesive material that will fixate the attachment to the gingiva portion of the dental prosthesis. The patent briefly describes digitally designing the retention pocket and injection channel but does not describe the exact process or the use of a Boolean (subtract or unite) Operation or the use of a CAD Assembly or body representing the attachment. Also one of the major limitations associated with the method disclosed in U.S. Pat. No. 9,801,701 is that it is only limited to a prosthesis where the teeth and the gingiva portions are fabricated separately. With the above disclosed alternative embodiment for the invention, a more detailed and accurate process is presented and allows for intrusion into the teeth portion of the restoration as the teeth and gingiva can be fabricated from a single piece of monolithic dental material.

In the second alternate embodiment, the overdenture is intended to attach to existing teeth rather than dental implants. Utilizing a scanning method common in the industry, preparations on existing teeth are scanned and a digital representation of the prepared teeth are generated. From this digital data, a framework or individual overdenture attachments can be designed and fabricated and attached to the existing teeth. In most instances, a coping will be designed for each individual tooth incorporated into the design. The coping will be designed with a margin and a cement gap to allow the coping to mate and be cemented onto the tooth. Next the operator may choose to utilize a similar CAD embodiment of a framework or overdenture abutment as previously discussed and use a Boolean unite operation to combine the coping (or series of copings) and framework or overdenture abutment into a single body. As obvious to the reader, the coping, framework and overdenture abutment assemblies will include the appropriate subtract bodies to create the appropriate mating surface and clearance gap into the underside of the overdenture 904. The dentist will cement the framework with copings or overdenture abutment and coping onto the appropriate teeth and seat the overdenture onto the framework or overdenture abutments using the appropriate housings, inserts, clips, etc. It is also obvious that any of the aforementioned alternate processes can be utilized for the design and fabrication of this alternate embodiment, such as the use of intra oral scanning for defining the margins of the prepared teeth or using the virtual set up for creating the diagnostic wax-up surface model 322.

These alternate embodiments only demonstrate some of the potential options in combining different digital data acquisition protocols into the invented process. As can be appreciated, these are only a handful of potential embodiments of the invented process, but should provide insight as to the adaptation of future technologies.

What is claimed:

1. A dental prosthesis for restoring the appearance and function of a patient's missing teeth comprising an overdenture, a dental implant framework and a series of implants and abutments adapted to be placed within a patient's mouth, wherein the dental implant framework is intended to mate to the series of implants and abutments wherein the design of the overdenture and dental implant framework are based upon digital data comprising the appropriate tooth contours, gingiva contours, and the placement of the plurality of implants and abutments, said data being obtained from the patient's mouth:

the dental implant framework further comprising a plurality of fittings to mate with the corresponding plurality of implants and abutments in the patient's mouth;

wherein the position of the plurality of fittings has been determined through the use of digital data identifying the location of the plurality of implants and abutments in the patient's mouth;

the dental implant framework further comprising a plurality of bridging structures attaching the plurality of fittings to one another;

the design of the overdenture and dental implant framework being determined from digital data from the patient's mouth defining the appropriate tooth contours, gingiva contours and implant and abutment locations for the dental prosthesis;

the overdenture further comprising a plurality of tooth and gingiva contours as defined by digital data obtained from the patient's mouth;

wherein the overdenture consists of a monolithic design wherein the tooth and gingiva contours are included in the same body;

the dental implant framework further comprising a plurality of retention features for retaining the overdenture;

the overdenture being able to be removed from the dental implant framework and the plurality of retention features by the patient or doctor;

the overdenture further comprising an overdenture mating surface for mating with the dental implant framework; and wherein the overdenture mating surface is created on the basis of a plurality of unique subtract bodies, wherein the plurality of unique subtract bodies is defined as at least one subtract body for mating with the dental implant framework.

2. The dental prosthesis of claim 1, wherein the plurality of retention features are part of the design of the plurality of bridging structures.

3. The dental prosthesis of claim 1, wherein the plurality of bridging structures have one or more areas wherein a prefabricated retention feature of the plurality of retention features can be attached to the dental implant framework.

4. The dental prosthesis of claim 3, wherein a prefabricated plurality of retention features can be attached by means of least one of threaded hole, mechanical fit, friction fit, weld, cement, adhesive, composite and acrylic.

5. The dental prosthesis of claim 3, wherein the plurality of retention features consists of one commonly available in the dental market.

6. The dental prosthesis of claim 1, wherein the position of the plurality of retention features are based upon digital data of the tooth and gingiva contours.

7. The dental prosthesis of claim 1, further comprising a plurality of attachments intended to be adhered to the overdenture and used to retain the overdenture to the dental implant framework with the use of at least one retention feature of the plurality of retention features.

8. The dental prosthesis of claim 7, wherein the plurality of attachments used to retain the overdenture to the dental implant framework consists of at least one of clips, an insert, or a housing.

9. The dental prosthesis of claim 1, wherein the plurality of unique subtract bodies used in creating the overdenture mating surface are dependent upon the design features of at least one of the dental implant framework, the retention features, or attachments intended to engage the retention features.

10. The dental prosthesis of claim 9, wherein the plurality of unique subtract bodies also creates a clearance gap or a series of clearance gaps in the overdenture mating surface for a plurality of attachments to be adhered to the overdenture and allow for the overdenture to be retained to the dental implant framework by means of the plurality of retention features.

11. The dental prosthesis of claim 1, wherein the plurality of unique subtract bodies allows for the overdenture to intimately mate with at least one of a top surface of the dental implant framework, a predefined surface of the dental implant framework, a surface of the plurality of fittings of the dental implant framework, the plurality of retention features of the dental implant framework and a plurality of attachments intended to mate with the plurality of retention features of the dental implant framework.

12. The dental prosthesis of claim 1, wherein the overdenture and dental implant framework can be manufactured simultaneously.

13. The dental prosthesis of claim 12, wherein the overdenture is fabricated out of at least one of a metallic material, a ceramic material, an acrylic material, a dental material, or a biocompatible material.

14. The dental prosthesis of claim 12, wherein the dental implant framework is fabricated out of at least one of titanium or other metallic materials, zirconia or other ceramic materials, acrylic or other composite materials, dental material, or a biocompatible material.

15. The dental prosthesis of claim 1, wherein digital data defining the appropriate tooth and gingiva contours are derived from at least one of scanning the diagnostic wax up, scanning an interim prosthesis, scanning an existing restoration or denture tooth set up, CAD models of the teeth and gingiva in a virtual set up, an intraoral scan of a diagnostic wax up, an intraoral scan or an interim prosthesis, an intraoral scan of the existing restoration or an intraoral scan of a denture tooth set up taken in the patient's mouth, a CT scan or series of CT scans of the patient's mouth, or a CT scan or series of CT scans with the use of a radiographic stent in the patient's mouth.

16. The dental prosthesis of claim 1, wherein design features of the overdenture and dental implant framework, are fully parametric and easily edited during a design phase.

17. The dental prosthesis of claim 16, wherein the design features of the overdenture and dental implant framework that are fully parametric and easily edited during the design phase include at least one of the plurality of bridging structures, plurality of fittings, plurality of retention features, a plurality of attachments, CAD models of the teeth as generated from digital data of the patient's mouth, CAD models of the gingiva contours as generated from digital data of the patient's mouth, or the plurality of unique subtract bodies used in creating the overdenture mating surface.

18. The dental prosthesis of claim 17, wherein the design features of the overdenture and dental implant framework are dependent upon one another, wherein changes to the orientation, dimensions or features of one design feature result in a simultaneous update in the design of the other dependent features.

19. The dental prosthesis of claim 1, wherein digital data for locations of the implants and abutments have been derived from one of the following; scanning analogs in the stone cast of the patient; an intraoral scan of the implants and abutments in the patient's mouth; digital surgical planning of proposed implant positions on the basis of a CT scan or series of CT scans; a CT scan or series of CT scans.

20. The dental prosthesis of claim 1, wherein the overdenture further comprises the gingiva contours from at least one of being captured in digital data defining the appropriate tooth and gingiva contours for a final dental prosthesis as designed by an operator, or cutback allowing for a technician to create the tooth or gingiva contours of the final dental prosthesis.

21. The dental prosthesis of claim 1, wherein the overdenture is designed and manufactured to receive a series of individual crowns, veneers or bridges.

22. A dental prosthesis for restoring the appearance and function of a patient's missing teeth comprising an overdenture, a series of implants and overdenture abutments adapted to be placed within a patient's mouth, wherein the overdenture abutments are intended to mate to the series of implants wherein the design of the overdenture is based upon digital data appropriate tooth contours, gingiva contours, and the location of the plurality of implants and abutments, said data being obtained from the patient's mouth:

wherein the position of the plurality of implants and overdenture abutments has been determined through the use of digital data of the patient's mouth identifying the location of the plurality of implants and overdenture abutments in the patient's mouth;

the design of the overdenture being determined from digital data of the patient's mouth defining the appropriate tooth contours, gingiva contours and plurality of implant and overdenture abutment locations for the dental prosthesis;

the overdenture further comprising a plurality of tooth and gingiva contours as defined by digital data of the patient's mouth;

wherein the overdenture consists of a monolithic design wherein the tooth contours and gingiva contours are included in the same body;

the plurality of overdenture abutments each consisting of a retention feature for retaining the overdenture;

the overdenture being able to be removed from the plurality of overdenture abutments and the plurality of retention features by the patient or doctor;

the overdenture further comprises an overdenture mating surface providing an appropriate recess to mate or provide clearance areas for the fixation of the plurality of overdenture abutments, and the plurality of retention features or attachments intended to engage the retention features; and wherein the overdenture mating surface is created on the basis of a plurality of unique subtract bodies, wherein the plurality of unique subtract bodies is defined as at least one subtract body for mating with the dental implant framework.

23. The dental prosthesis of claim 22, wherein the overdenture abutments can be attached to the implants by means of least one of threaded hole, mechanical fit, friction fit, cement, adhesive, composite or acrylic.

24. The dental prosthesis of claim 22, wherein the overdenture abutments consists of one commonly available in the dental market.

25. The dental prosthesis of claim 22, further comprising a plurality of attachments intended to be adhered to the overdenture and used to retain the overdenture to the plurality of overdenture abutments with the use of the plurality of retention features.

26. The dental prosthesis of claim 25, wherein the plurality of attachments used to retain the overdenture to the plurality of overdenture abutments consists of at least one of clips, an insert, a housing and a combination of a clip, an insert or housing.

27. The dental prosthesis of claim 22, wherein the plurality of unique subtract bodies used in creating the overdenture mating surface is dependent upon the design features of at least one of the overdenture abutments, the retention features, or attachments intended to engage the retention features.

28. The dental prosthesis of claim 27, wherein the plurality of unique subtract bodies also creates a clearance gap or a series of clearance gaps in the overdenture mating surface for a plurality of attachments to be adhered to the overdenture and allow for the overdenture to be retained to the plurality of overdenture abutments by means of the plurality of retention features.

29. The dental prosthesis of claim 22, wherein the plurality of unique subtract bodies allows for the overdenture to intimately mate with at least one of a top surface of the overdenture abutments, a predefined surface of the overdenture abutments, the retention features of the plurality of overdenture abutments or plurality of attachments intended to mate with the plurality of retention features of the plurality of overdenture abutments.

30. The dental prosthesis of claim 22, wherein digital data defining the appropriate tooth and gingiva contours are derived from at least one of a scanning a diagnostic wax up, a scanning of an interim prosthesis, a scanning of an existing restoration or denture tooth set up, CAD models of the teeth and gingiva in a virtual set up, an intraoral scan of a diagnostic wax up, an intraoral scan of an interim prosthesis, an intraoral scan of an existing prosthesis or denture tooth set up taken in the patient's mouth, a CT scan or series of CT scans of the patient's mouth, or a CT scan or series of CT scans with the use of a radiographic stent in the patient's mouth.

31. The dental prosthesis of claim 22, wherein the overdenture abutments consist of a custom design.

32. The dental prosthesis of claim 31, wherein the overdenture and overdenture abutments can be manufactured simultaneously.

33. The dental prosthesis of claim 31, wherein the design features of the overdenture and overdenture abutments, are fully parametric and easily edited during a design phase.

34. The dental prosthesis of claim 33, wherein the design features of the overdenture and overdenture abutments that are fully parametric and easily edited during the design phase include at least one of overdenture abutment design, overdenture abutment height, overdenture abutment diameter, overdenture abutment orientation, overdenture abutment emergence profile, retention features, attachments, CAD models of the teeth, CAD models of the gingiva contours or the plurality of subtract bodies.

35. The dental prosthesis of claim 34, wherein the design features of the overdenture and overdenture abutments are dependent upon one another, wherein changes to the orientation, dimensions or features of one design feature result in a simultaneous update in the design of the other dependent features.

36. The dental prosthesis of claim 22, wherein digital data for locations of the plurality of implants and overdenture abutments have been derived from at least one of scanning analogs in a stone cast of the patient, an intraoral scan of the implants and abutments in the patient's mouth, digital surgical planning of proposed implant positions on the basis of a CT scan or series of CT scans, or a CT scan or series of CT scans.

37. The dental prosthesis of claim 22, wherein the overdenture includes at least one of the gingiva contours captured in digital data defining the appropriate tooth and gingiva contours for a final dental prosthesis, gingiva contours as designed by an operator, or a cutback allowing for a technician to create the tooth or gingiva contours of a final prosthesis.

38. The dental prosthesis of claim 22, wherein the overdenture is fabricated from at least one of a metallic material, a ceramic material, an acrylic material, a dental material, or a biocompatible material.

39. The dental prosthesis of claim 22, wherein the overdenture abutments are fabricated out of at least one of titanium or other metallic materials, zirconia or other ceramic materials, acrylic or other composite materials, dental material, or a biocompatible material.

40. The dental prosthesis of claim 22, wherein the overdenture is designed and manufactured to receive a series of individual crowns, veneers or bridges.

* * * * *